(12) United States Patent
McHenry et al.

(10) Patent No.: US 8,064,840 B2
(45) Date of Patent: Nov. 22, 2011

(54) METHOD AND SYSTEM FOR DETERMINING SPECTRUM AVAILABILITY WITHIN A NETWORK

(75) Inventors: Mark Allen McHenry, McLean, VA (US); Alexe E. Leu, Arlington, VA (US)

(73) Assignee: Shared Spectrum Company, Vienna, VA (US)

( * ) Notice: Subject to any disclaimer, the term of this patent is extended or adjusted under 35 U.S.C. 154(b) by 0 days.

(21) Appl. No.: 12/487,257

(22) Filed: Jun. 18, 2009

(65) Prior Publication Data

US 2010/0008313 A1  Jan. 14, 2010

Related U.S. Application Data

(63) Continuation of application No. 11/432,536, filed on May 12, 2006, now Pat. No. 7,564,816.

(51) Int. Cl.
*H04B 17/00* (2006.01)
(52) U.S. Cl. .................................................. 455/67.16
(58) Field of Classification Search .................. 455/423, 455/426.1, 67.11, 67.13, 62, 452.1, 226.2, 455/63.1, 41.2, 296, 226.3, 509, 403, 450, 455/464, 434, 516, 527, 512, 68, 67.16; 370/329, 370/237, 347, 337, 346, 330, 332, 444, 395.42, 370/252
See application file for complete search history.

(56) References Cited

U.S. PATENT DOCUMENTS

| | | | |
|---|---|---|---|
| 3,893,064 A | 7/1975 | Nishihara et al. |
| 3,935,572 A | 1/1976 | Broniwitz et al. |
| 4,107,613 A | 8/1978 | Queen et al. |
| 4,119,964 A | 10/1978 | Fletcher et al. |
| 4,227,255 A | 10/1980 | Carrick et al. |
| 4,305,150 A | 12/1981 | Richmond et al. |
| 4,398,220 A | 8/1983 | Satoh |
| 4,501,020 A | 2/1985 | Wakeman |
| 4,672,657 A | 6/1987 | Dershowitz |

(Continued)

FOREIGN PATENT DOCUMENTS

EP  1220499 A2  3/2002

(Continued)

OTHER PUBLICATIONS

Ditri, Dynamic spectrum access moves to the forefront, 2008.
McHenry, XG DSA Radio System, New Frontiers in Dynamic Spectrum Access Networks, 2008.
Perich, Experimental Field Test Results on Feasibility of Declarative Spectrum Management, 3rd IEEE International Symposium on New Frontiers in Dynamic Spectrum Access Networks, 2008.

(Continued)

*Primary Examiner* — Melody Mehrpour
(74) *Attorney, Agent, or Firm* — Kilpatrick Townsend and Stockton LLP

(57) ABSTRACT

A method and transceiver for determining spectrum availability within a give area is disclosed. The given area includes cells in a grid. A belief evaluator receives a measurement from a signal and assigns an instantaneous belief indicator, an instantaneous disbelief indicator and an instantaneous ignorance indicator based on a detection threshold and the power level of the measurement. The indicators quantify the probability of a presence of a transmitter within the grid cell. A belief accumulator uses the instantaneous indicators along with accumulated belief, disbelief and ignorance indicators from previous measurements to determine cumulative belief, disbelief and ignorance indicators. The accumulated belief, disbelief and ignorance indicators are the results of previous measurements and belief/disbelief/ignorance determinations for the grid cell. An allocator indicates the status of the grid cell and whether a spectrum is available. If a spectrum is available, then the grid cell is added to other available cells within the area to generate the spectrum hole.

20 Claims, 6 Drawing Sheets

U.S. PATENT DOCUMENTS

| | | | |
|---|---|---|---|
| 4,736,453 A | 4/1988 | Schloemer | |
| 4,783,780 A | 11/1988 | Alexis | |
| 4,803,703 A | 2/1989 | DeLuca et al. | |
| 4,878,238 A | 10/1989 | Rash et al. | |
| 4,881,271 A | 11/1989 | Yamauchi | |
| 4,918,730 A | 4/1990 | Schulze | |
| 4,977,612 A | 12/1990 | Wilson | |
| 5,040,238 A | 8/1991 | Comroe et al. | |
| 5,093,924 A | 3/1992 | Toshiyuki et al. | |
| 5,093,927 A | 3/1992 | Shanley | |
| 5,142,690 A | 8/1992 | McMullan et al. | |
| 5,142,691 A | 8/1992 | Freeburg et al. | |
| 5,151,747 A | 9/1992 | Nourrcier | |
| 5,155,590 A | 10/1992 | Beyers et al. | |
| 5,162,937 A | 11/1992 | Heidemann et al. | |
| 5,177,604 A | 1/1993 | Martinez | |
| 5,177,767 A | 1/1993 | Kato | |
| 5,179,722 A | 1/1993 | Gunmar et al. | |
| 5,203,012 A | 4/1993 | Patsiokas et al. | |
| 5,225,902 A | 7/1993 | McMullan, Jr. | |
| 5,239,676 A | 8/1993 | Strawczynski et al. | |
| 5,247,701 A | 9/1993 | Comroe et al. | |
| 5,260,974 A | 11/1993 | Johnson et al. | |
| 5,271,036 A | 12/1993 | Lobert et al. | |
| 5,276,908 A | 1/1994 | Koohgoli et al. | |
| 5,325,088 A | 6/1994 | Willard et al. | |
| 5,375,123 A | 12/1994 | Andersson et al. | |
| 5,402,523 A | 3/1995 | Berg | |
| 5,410,737 A | 4/1995 | Jones | |
| 5,412,658 A | 5/1995 | Arnold et al. | |
| 5,422,912 A | 6/1995 | Asser et al. | |
| 5,422,930 A | 6/1995 | McDonald et al. | |
| 5,428,819 A | 6/1995 | Wang et al. | |
| 5,448,753 A | 9/1995 | Ahl et al. | |
| 5,475,868 A | 12/1995 | Duque-Anton et al. | |
| 5,497,505 A | 3/1996 | Koohgoli et al. | |
| 5,502,688 A | 3/1996 | Recchione et al. | |
| 5,511,233 A | 4/1996 | Otten | |
| 5,548,809 A | 8/1996 | Lemson | |
| 5,553,081 A | 9/1996 | Downey et al. | |
| 5,585,850 A | 12/1996 | Schwaller | |
| 5,608,727 A | 3/1997 | Perreault et al. | |
| 5,655,217 A | 8/1997 | Lemson | |
| 5,668,747 A | 9/1997 | Ohashi | |
| 5,748,678 A | 5/1998 | Valentine et al. | |
| 5,752,164 A | 5/1998 | Jones | |
| 5,794,151 A | 8/1998 | McDonald et al. | |
| 5,822,686 A | 10/1998 | Lundberg et al. | |
| 5,828,948 A | 10/1998 | Almgren et al. | |
| 5,850,605 A | 12/1998 | Souissi et al. | |
| 5,862,487 A | 1/1999 | Fujii et al. | |
| 5,884,181 A | 3/1999 | Arnold et al. | |
| 5,889,821 A | 3/1999 | Arnstein et al. | |
| 5,939,887 A | 8/1999 | Schmidt et al. | |
| 5,943,622 A | 8/1999 | Yamashita | |
| 5,960,351 A | 9/1999 | Przelomiec | |
| 5,999,561 A | 12/1999 | Naden et al. | |
| 6,011,970 A | 1/2000 | McCarthy | |
| 6,044,090 A | 3/2000 | Grau et al. | |
| 6,047,175 A | 4/2000 | Trompower | |
| 6,049,707 A | 4/2000 | Buer et al. | |
| 6,049,717 A | 4/2000 | Dufour et al. | |
| 6,141,557 A | 10/2000 | Dipiazza | |
| 6,147,553 A | 11/2000 | Kolanek | |
| 6,154,501 A | 11/2000 | Friedman | |
| 6,157,811 A | 12/2000 | Dent | |
| 6,178,328 B1 | 1/2001 | Tang et al. | |
| 6,188,873 B1 | 2/2001 | Wickman et al. | |
| 6,208,858 B1 | 3/2001 | Antonio et al. | |
| 6,240,274 B1 | 5/2001 | Izadpanah | |
| 6,269,331 B1 | 7/2001 | Alanara et al. | |
| 6,295,289 B1 | 9/2001 | Ionescu et al. | |
| 6,304,140 B1 | 10/2001 | Thron et al. | |
| 6,356,555 B1 | 3/2002 | Rakib et al. | |
| 6,380,879 B2 | 4/2002 | Kober et al. | |
| 6,522,885 B1 | 2/2003 | Tang et al. | |
| 6,526,264 B2 | 2/2003 | Sugar et al. | |
| 6,529,715 B1 | 3/2003 | Kitko et al. | |
| 6,570,444 B2 | 5/2003 | Wright | |
| 6,597,301 B2 | 7/2003 | Cerra | |
| 6,606,593 B1 | 8/2003 | Jarvinen et al. | |
| 6,615,040 B1 | 9/2003 | Benveniste | |
| 6,625,111 B1 | 9/2003 | Sudo | |
| 6,671,503 B1 | 12/2003 | Niwamoto | |
| 6,675,012 B2 | 1/2004 | Gray | |
| 6,687,492 B1 | 2/2004 | Sugar et al. | |
| 6,690,746 B1 | 2/2004 | Sills et al. | |
| 6,697,436 B1 | 2/2004 | Wright et al. | |
| 6,700,450 B2 | 3/2004 | Rogers | |
| 6,714,605 B2 | 3/2004 | Sugar et al. | |
| 6,714,780 B1 | 3/2004 | Antonio et al. | |
| 6,728,517 B2 | 4/2004 | Sugar et al. | |
| 6,771,957 B2 * | 8/2004 | Chitrapu | 455/423 |
| 6,785,520 B2 | 8/2004 | Sugar et al. | |
| 6,792,268 B1 | 9/2004 | Benveniste et al. | |
| 6,799,020 B1 | 9/2004 | Heidmann et al. | |
| 6,816,832 B2 | 11/2004 | Alanara et al. | |
| 6,847,678 B2 | 1/2005 | Berezdivin et al. | |
| 6,850,735 B2 | 2/2005 | Sugar et al. | |
| 6,850,764 B1 | 2/2005 | Patel | |
| 6,862,456 B2 | 3/2005 | Sugar et al. | |
| 6,904,269 B1 | 6/2005 | Deshpande et al. | |
| 6,941,110 B2 | 9/2005 | Kloper et al. | |
| 6,952,563 B2 | 10/2005 | Brown et al. | |
| 6,959,178 B2 | 10/2005 | Macedo et al. | |
| 6,965,762 B2 | 11/2005 | Sugar et al. | |
| 6,990,087 B2 | 1/2006 | Rao et al. | |
| 6,993,440 B2 | 1/2006 | Anderson et al. | |
| 7,013,345 B1 | 3/2006 | Brown et al. | |
| 7,035,593 B2 | 4/2006 | Miller et al. | |
| 7,054,625 B2 | 5/2006 | Kawasaki et al. | |
| 7,058,383 B2 | 6/2006 | Sugar et al. | |
| 7,089,014 B2 | 8/2006 | Brown et al. | |
| 7,227,974 B2 | 6/2007 | Kamijo et al. | |
| 7,260,158 B2 | 8/2007 | Krupezevic et al. | |
| 7,269,151 B2 | 9/2007 | Diener et al. | |
| 7,313,393 B2 * | 12/2007 | Chitrapu | 455/425 |
| 7,342,876 B2 | 3/2008 | Bellur et al. | |
| 7,424,268 B2 * | 9/2008 | Diener et al. | 455/62 |
| 7,428,270 B1 | 9/2008 | Dubuc et al. | |
| 7,457,295 B2 | 11/2008 | Saunders et al. | |
| 7,463,952 B2 | 12/2008 | Bidou et al. | |
| 7,483,700 B2 * | 1/2009 | Buchwald et al. | 455/434 |
| 7,532,857 B2 | 5/2009 | Simon | |
| 7,564,816 B2 * | 7/2009 | McHenry et al. | 370/329 |
| 7,610,036 B2 * | 10/2009 | Teo et al. | 455/403 |
| 7,613,148 B2 | 11/2009 | Hong et al. | |
| 7,742,764 B2 * | 6/2010 | Gillig et al. | 455/434 |
| 7,826,839 B1 | 11/2010 | Nicholas | |
| 2001/0013834 A1 | 8/2001 | Yamazaki | |
| 2001/0046843 A1 | 11/2001 | Alanara et al. | |
| 2002/0002052 A1 | 1/2002 | McHenry | |
| 2002/0196842 A1 | 12/2002 | Onggosanusi et al. | |
| 2003/0027577 A1 | 2/2003 | Brown et al. | |
| 2003/0081628 A1 | 5/2003 | Sugar et al. | |
| 2003/0099218 A1 | 5/2003 | Tillotson | |
| 2003/0165187 A1 | 9/2003 | Tesfai et al. | |
| 2003/0181173 A1 | 9/2003 | Sugar et al. | |
| 2003/0181211 A1 | 9/2003 | Razavilar et al. | |
| 2003/0181213 A1 | 9/2003 | Sugar et al. | |
| 2003/0198200 A1 | 10/2003 | Diener et al. | |
| 2003/0203743 A1 | 10/2003 | Sugar et al. | |
| 2004/0017268 A1 | 1/2004 | Rogers | |
| 2004/0023674 A1 | 2/2004 | Miller | |
| 2004/0047324 A1 | 3/2004 | Diener | |
| 2004/0072546 A1 | 4/2004 | Sugar et al. | |
| 2004/0121753 A1 | 6/2004 | Sugar et al. | |
| 2004/0136466 A1 | 7/2004 | Tesfai et al. | |
| 2004/0142696 A1 | 7/2004 | Saunders et al. | |
| 2004/0203474 A1 | 10/2004 | Miller et al. | |
| 2005/0070294 A1 | 3/2005 | Lyle et al. | |
| 2005/0119006 A1 | 6/2005 | Cave et al. | |
| 2005/0192011 A1 | 9/2005 | Hong et al. | |
| 2005/0213580 A1 | 9/2005 | Mayer et al. | |
| 2005/0213763 A1 | 9/2005 | Owen et al. | |
| 2005/0270218 A1 | 12/2005 | Chiodini | |
| 2006/0075467 A1 | 4/2006 | Sanda et al. | |

| | | | |
|---|---|---|---|
| 2006/0211395 | A1 | 9/2006 | Waltho |
| 2006/0220944 | A1 | 10/2006 | Ikeda |
| 2006/0234716 | A1 | 10/2006 | Vesterinen et al. |
| 2006/0246836 | A1 | 11/2006 | Simon |
| 2007/0008875 | A1 | 1/2007 | Gerhardt et al. |
| 2007/0019603 | A1 | 1/2007 | Gerhardt et al. |
| 2007/0046467 | A1 | 3/2007 | Chakraborty et al. |
| 2007/0053410 | A1 | 3/2007 | Mahonen et al. |
| 2007/0076745 | A1 | 4/2007 | Manjeshwar et al. |
| 2007/0091998 | A1 | 4/2007 | Woo et al. |
| 2007/0100922 | A1 | 5/2007 | Ashish |
| 2007/0165664 | A1 | 7/2007 | Gerhardt et al. |
| 2007/0165695 | A1 | 7/2007 | Gerhardt et al. |
| 2007/0183338 | A1 | 8/2007 | Singh et al. |
| 2007/0253394 | A1 | 11/2007 | Horiguchi et al. |
| 2008/0010040 | A1 | 1/2008 | McGehee |
| 2008/0014880 | A1 | 1/2008 | Hyon et al. |
| 2008/0031143 | A1 | 2/2008 | Ostrosky |
| 2008/0069079 | A1 | 3/2008 | Jacobs |
| 2008/0228446 | A1 | 9/2008 | Baraniuk et al. |
| 2008/0261537 | A1* | 10/2008 | Chen ............................... 455/68 |
| 2008/0267259 | A1 | 10/2008 | Budampati et al. |
| 2008/0284648 | A1 | 11/2008 | Takada et al. |
| 2009/0074033 | A1 | 3/2009 | Kattwinkel |
| 2009/0161610 | A1* | 6/2009 | Kang et al. ..................... 370/329 |
| 2009/0190508 | A1 | 7/2009 | Kattwinkel |
| 2009/0252178 | A1* | 10/2009 | Huttunen et al. ............. 370/445 |
| 2010/0008312 | A1* | 1/2010 | Viswanath ..................... 370/329 |
| 2010/0220618 | A1 | 9/2010 | Kwon et al. |
| 2010/0296078 | A1 | 11/2010 | Forrer et al. |
| 2011/0051645 | A1 | 3/2011 | Hong et al. |

FOREIGN PATENT DOCUMENTS

| | | |
|---|---|---|
| GB | 2260879 | 4/1993 |
| WO | WO/2004/054280 A2 | 6/2004 |
| WO | WO 2006-101489 A1 | 9/2006 |
| WO | WO 2007-034461 A2 | 3/2007 |
| WO | WO/2007/058490 A1 | 5/2007 |
| WO | WO/2007/094604 A1 | 8/2007 |
| WO | WO/2007/096819 A2 | 8/2007 |
| WO | WO/2007/108963 A2 | 9/2007 |
| WO | WO2007/108966 A2 | 9/2007 |
| WO | WO/2007/109169 A2 | 9/2007 |
| WO | WO/2007/109170 A2 | 9/2007 |

OTHER PUBLICATIONS

Tenhula, Update on XG and Follow-on Programs: Cognitive Radio for Tactical and Public Safety Communications, 2008.

Tenhula, Policy-Based Spectrum Access Control for Public Safety Cognitive Radio Systems, 2008.

Erpek, Location-based Propagation Modeling for Opportunistic Spectrum Access in Wireless Networks, 2007.

Perich, Policy-Based Network Management for NeXt Generation Spectrum Access Control, 2nd IEEE International Symposium on New Frontiers in Dynamic Spectrum Access Networks, 2007.

Seelig, A Description of the Aug. 2006 XG Demonstrations at Fort A.P. Hill, 2nd IEEE International Symposium on New Frontiers in Dynamic Spectrum Access Networks, 2007.

SSC, Products, 2007.

SSC, Shared Spectrum Company to Demonstrate XG Radio Technology At IEEE Dyspan Conference, 2007.

SSC, Shared Spectrum Company to Introduce Dynamic Spectrum Access Technology At WIMAX Conference, 2007.

SSC, Thales Communications and Shared Spectrum Company Team to Add Dynamic Spectrum Access Technology to Military Radios, 2007.

Steadman, Dynamic Spectrum Sharing Detectors, 2nd IEEE International Symposium on New Frontiers in Dynamic Spectrum Access Networks, 2007.

Zeng, Maximum-Minimum Eigenvalue Detection for Cognitive Radio, Personal, Indoor and Mobile Radio Communications, EEE 18th International Symposium on, 2007, pp. 1-5.

Adaptive Spectrum Technology: Findings From the DARPA XG Project, 2007.

McHenry, XG dynamic spectrum access field test results [Topics in Radio Communications], Communications Magazine, IEEE, 2007, no vol. 45, Issue: 6.

McHenry, Creation of a Spectrum Sharing Innovation Test-Bed and The President's Spectrum Policy Initiative Spectrum Sharing Innovation Test-Bed, 2006.

SSC, Shared Spectrum Company Successfully Demonstrates neXt Generation (XG) Wireless Communications System, 2006.

Tenhula, Shared Spectrum Company Successfully Demonstrates Next Generation (XG) Wireless System, 2006.

Anticipated XG VIP Demo Invitees, 2006.

Dynamic Spectrum Sharing Bid, Lease \& MVNO/MVNE: Spectrum Options for Operators, 2006.

Secondary Markets \& Spectrum Leasing UTC Telecom 2006, Tampa, FL May 23, 2006.

XG Dynamic Spectrum Experiments, Findings and Plans Panel, 2006.

Zheng, Device-centric spectrum management, New Frontiers in Dynamic Spectrum Access Networks, 2005. DySPAN 2005. 2005 First IEEE International Symposium on, 2005, pp. 56-65.

Ackland, High Performance Cognitive Radio Platform with Integrated Physical and Network Layer Capabilities, Network Centric Cognitive Radio, 2005.

Leu, Ultra sensitive TV detector measurements, New Frontiers in Dynamic Spectrum Access Networks, 2005.

McHenry, The probe spectrum access method, New Frontiers in Dynamic Spectrum Access Networks, 2005. DySPAN 2005. 2005 First IEEE International Symposium on, 2005, pp. 346-351.

Ramanathan and Partridge, Next Generation (XG) Architecture and Protocol Development (XAP), 2005.

Steenstrup, Channel Selection among Frequency-Agile Nodes in Multihop Wireless Networks, 2005.

Zhao, Distributed coordination in dynamic spectrum allocation networks, New Frontiers in Dynamic Spectrum Access Networks, 2005. DySPAN 2005. First IEEE International Symposium on, 2005, pp. 259-268.

Dynamic Spectrum Sharing Presentation, 2005.

Supplementary European Search Report in the European Application No. 01 94 5944 dated Apr. 24, 2009.

PCT Office Communication in the PCT application No. PCT/US2008/073193 dated Jun. 2, 2009.

Cabric et al. "Implementation issues in spectrum sensing for cognitive radios" Signals Systems and Computers, 2004. Conference record of the 38th Asilomar Conference on Pacific Grove, CA, USA, Nov. 7-10, 2004, NJ, USA, vol. 1, pp. 772-776, sections I-IV, Nov. 7, 2004.

Ning Han et al., "Spectral correlation based on signal detection method for spectrum sensing in IEEE 802.22 WRAN systems" Advanced Communication Technology, 2006. ICACT 2006. The 8th International Conference, vol. 3, Feb. 20-22, 2006, NJ, USA, pp. 1765-1770.

Falconer, D. et al., "Frequency Domain Equalization for Single-Carrier Broadband Wireless Systems", IEEE Communications Magazine (Apr. 2002).

Rohde, U. L. et al., "RF/Microwave Circuit Design for Wireless Applications", published by Wiley-Interscience (Mar. 2000).

The International Search Report, mailed Mar. 25, 2005, in related International Application No. PCT/US04/17883, filed Jun. 9, 2004.

International Search Report mailed Oct. 6, 2008, issued in corresponding International Application No. PCT/US07/22356, filed Oct. 19, 2007.

International Search Report and Written Opinion, mailed Feb. 8, 2002, issued in corresponding International Application No. PCT/US01/14853.

International Search Report and Written Opinion, mailed Mar. 18, 2008, issued in corresponding International Application No. PCT/US07/11414.

International Search Report and Written Opinion, mailed Sep. 28, 2009, issued in corresponding International Application No. PCT/US08/073194.

International Search Report and Written Opinion, mailed Feb. 14, 2008, issued in corresponding International Application No. PCT/US07/21940.

Zhou et al., "Detection timing and channel selection for periodic spectrum sensing in cognitive radio", 2008 IEEE, pp. 1-5.

Mahbubani et al., "Dynamic channel allocation in wireless ad-hoc networks" pp. 1-12.

Project: IEEE P802.15 working group for wireless personal area networks (WPANs), pp. 1-25.

* cited by examiner $$q_{i,j} = \frac{\alpha_{i,j}}{2\pi} \left[ Q\left( \frac{g(R_{i,j} + s/2) - L}{\sigma} \right) - Q\left( \frac{g(R_{i,j} - s/2) - L}{\sigma} \right) \right]$$

for any $k = 1,2$.

METHOD AND SYSTEM FOR DETERMINING SPECTRUM AVAILABILITY WITHIN A NETWORK

CROSS-REFERENCES TO RELATED APPLICATIONS

This application is a continuation if U.S. application Ser. No. 11/432,536, filed May 12, 2006, the disclosure of which is incorporated by reference in its entirety.

STATEMENT REGARDING FEDERALLY-SPONSORED RESEARCH

This invention was made with Government support under Contract No. FA8750-05-C-0150 awarded by the Air Force. The Government has certain rights in this invention.

BACKGROUND OF THE INVENTION

1. Field of the Invention

The present invention relates to wireless networks that provide communication services between transmitters and transceivers. More particularly, the present invention relates to determining and using the spectrum availability based on the presence or absence of signals to reallocate power to enable services at the transceivers that do not interfere with existing transmissions.

2. Background of the Related Art

Wireless communications between varieties of devices is increasing. Frequency allocation of the radio spectrum, location of transmitters and devices and other factors impact the availability of a communication service, especially when trying to avoid interference with existing networks and transmitters. A service, for example, may be defined as transmit or receive actions using a wireless device. A telephone call, downloading files, text messaging, and the like are all examples of services that may be initiated if the spectrum is available.

Thus, instances may exist where one wishes to transmit at a certain power level within an available portion of the spectrum that is not being used within a certain geographical region. This portion, also referred to as a geographical spectrum hole, is sensed and discovered using algorithms and measurements. Thus, if a spectrum hole is determined, then a node, or transceiver, can transmit or receive communications in the unused portion of the spectrum.

In wireless networking, the radio spectrum is shared dynamically over time between primary networks and nodes. Certain nodes are referred to as next generation, or XG, nodes. Each node is equipped with the sensing and discovery algorithms to delimit the geographical regions with unused spectrum, or the spectrum holes. Spectrum sharing behaviors include protocols or schemes employed by a transceiver to select transmission channels and power levels to avoid causing significant interference to primary networks or existing and non-cooperative (NC) users. Depending on the scenario, different types of dynamic spectrum sharing behaviors may be used by the transceiver.

For example, single node behaviors use spectrum occupancy measurements made by a single transceiver to determine if a channel can be used by the transceiver without causing significant interference with existing networks. One such process is referred to as Listen-Before-Talk (LBT). LBT causes the transceiver to abandon a channel and move to a different one if a received measurement is above a threshold, which may be referred to as a positive reading. The LBT process on an XG node uses an algorithm that integrates power within a particular frequency band over a short-time interval, or listening period.

If the received measurement includes signal power below the detection threshold, then a negative reading is noted by the LBT process. A negative reading indicates that a spectrum hole may exist for the listened channel. Thus, the transceiver is able to transmit at a conservative power level for a short period of time, or a transmitting period. The spectrum hole of the LBT process implies a circular spectrum hole centered at the measurement location with a radius approximately equal to a distance percentile, or $\alpha$, where $\alpha$ is less than 1%. The distance percentile, or $\alpha$, can be determined in several ways known in the art, such as using a model, using simulations or through real testing measurements.

The LBT process, however, fails to keep track of the spectrum holes discovered with past measurements. The LBT process discards the measurements after they are analyzed. Thus, the spectrum hole remains constant and changes its location along the movement trajectory to the positions where the measurements are taken. Further, the spectrum availability determination is limited to the area of that spectrum hole. This area, depending on transmit power and other factors, may not be large or reliable enough to provide an appropriate listening period to determine the presence of a NC transmitter. In addition, interference may occur as the transceiver moves its location after the initial LBT determination is made.

SUMMARY OF THE INVENTION

The present invention relates to a solution approach for determining spectrum holes for a communication network. The present invention achieves this and other objectives by accumulating the information obtained from previous received signals to determine the presence of a larger spectrum hole that allows a reduced listening period, higher transmit power and a reduced probability of interference with other networks and transmitters.

A transceiver, such as one in a node, or any other device, determines the probability of the presence or absence of a transmitter within an area and uses this information to determine a spectrum hole. A node may be a mobile phone or other device that connects with a network that provides receive and send functions. The node includes the transceiver along with other components, such as a display or keypad. The transceiver may be the actual components that receive a signal, perform digital signal processing, transmit a signal and other functions within the node.

Using the embodiments disclosed by the present invention, the detected spectrum availabilities are grouped together in accordance with previously collected measurements at the transceiver and other transceivers. A region of interest may be divided up into smaller areas, or cells. The belief and disbelief for each cell is determined and used to generate a spectrum hole. For example, smaller areas are grouped together with other smaller areas to determine a spectrum hole. Measurements do not necessarily have to be taken in each of the smaller areas in order to determine the spectrum hole. The determinations may occur as a transceiver, or multiple transceivers, moves along a route or multiple trajectories.

The present invention also extends the applicability of the LBT algorithm to enable higher allowable transmission power levels that do not interfere with non-cooperating transmitters. By measuring received signal strength, the information is combined with prior knowledge of signal strengths among multiple receivers to determine a maximum permissible transmit power within the spectrum hole. The term permissible transmit power is used because the transmission signal from the node should not interfere with other transmitters within or outside the spectrum hole.

The present invention uses group behavior algorithms and methods to improve spectrum hole detection and power allocation. For example, the Dempster-Shafer Theory (DST) is used with a sensing and discovery algorithm, such as LBT, to determine the presence of spectrum holes than the sensing and discovery algorithm could perform alone. When measurements are made at different locations, the results are unified to expand the known spectrum hole or to create a larger one than known LBT methods. Further, a central processing location can take in measurements or results from multiple locations to determine a spectrum hole better suited to the central processing location's needs.

According to the present invention, a method for determining spectrum availability for a transceiver is disclosed. The method includes performing a measurement. The measurement includes a power level. The method also includes determining a probability of a presence of a transmitter in a grid cell based on the measurement. The method also includes assigning an instantaneous belief indicator, an instantaneous disbelief indicator, and an instantaneous ignorance indicator to the grid cell using a detection threshold and a parameter determined by a propagation loss distribution function and the power level. The method also includes determining a cumulative belief indicator, a cumulative disbelief indicator and a cumulative ignorance indicator using the instantaneous belief indicator, the instantaneous disbelief indicator and the instantaneous ignorance indicator. The method also includes indicating spectrum availability in the grid cell based on the cumulative belief indicator, the cumulative disbelief indicator and the cumulative ignorance indicator.

According to the present invention, a method for determining spectrum availability within a given area is disclosed. The method includes performing a measurement of a power level by at least one transceiver. The method also includes computing a probability of a presence of a transmitter for at least one grid cell within the given area according to the measurement of the power level. The method also includes determining an instantaneous belief indicator, an instantaneous disbelief indicator and an instantaneous ignorance indicator for the at least one grid cell using a detection threshold and the probability of the presence of a transmitter. The method also includes using the cumulative belief indicator, the cumulative disbelief indicator and cumulative ignorance indicator to determine spectrum availability in the grid cell. The method also includes generating a spectrum hole by combining the spectrum availability in the grid cell with spectrum availability within at least one other grid cell.

According to the present invention, a transceiver also is disclosed. The transceiver includes a belief evaluator to assign a probability of a presence of a transmitter in a grid cell and to determine an instantaneous belief indicator, an instantaneous disbelief indicator and an instantaneous ignorance indicator for the grid cell within an area based on a measurement of a power level, a detection threshold and the probability. The transceiver also includes a belief accumulator to determine a cumulative belief indicator, a cumulative disbelief indicator and cumulative ignorance indicator for the presence of a transmitter within a grid cell using the instantaneous belief indicator, the instantaneous disbelief indicator and the instantaneous ignorance indicator and accumulated belief and disbelief indicators in a group behavior algorithm. The transceiver also includes an allocator to indicate spectrum availability within the grid cell according to the cumulative belief, the cumulative disbelief indicator and the cumulative ignorance indicator.

Thus, a transceiver defines an applicable radius that includes at least one grid cell of a region of interest. The value of the radius can depend upon whether a power level measurement is above or below a detection threshold. The detection threshold is variable and depends on the desired radius having the transceiver at its center. Using the defined radius and other parameters, the present invention determines an instantaneous probability for each grid cell within the radius that a non-cooperating transmitter may interfere with services between the transceiver and the network. The instantaneous probabilities then are used to quantify the instantaneous belief, the instantaneous disbelief and instantaneous ignorance of the transmitter is within each grid cell using parameters corresponding to the radius defined above.

The instantaneous belief, disbelief and ignorance for each grid cell updates the accumulated belief, disbelief and ignorance for the cell. The accumulated belief, disbelief and ignorance values are derived from previous measurements taken by the transceiver and other transceivers having the grid cell within their radii. The instantaneous belief, disbelief and ignorance indicators' values are associated with the accumulated values using a group behavior relationship algorithm, such Dempster Shafer Theory (DST), to determine the cumulative belief, disbelief and ignorance values for the discrete time instance of a new measurement. Each grid cell, therefore, determines a cumulative belief, disbelief and ignorance of the presence or absence of a transmitter. The transceiver uses this information to determine the size and scope of any available spectrum. The transceiver also may send the information for its grid cells to another transceiver, such as a central transceiver, for further processing and determination of greater spectrum availability.

BRIEF DESCRIPTION OF THE DRAWINGS

The accompanying drawings are included to provide further understanding of the invention and constitute a part of the specification. The drawings listed below illustrate embodiments of the invention and together with the description serves to explain the principles of the invention.

DETAILED DESCRIPTION OF THE PREFERRED EMBODIMENTS

Reference will now be made in detail to the preferred embodiments of the present invention. Examples of the preferred embodiments are illustrated in the accompanying drawings.

Figure 1A:
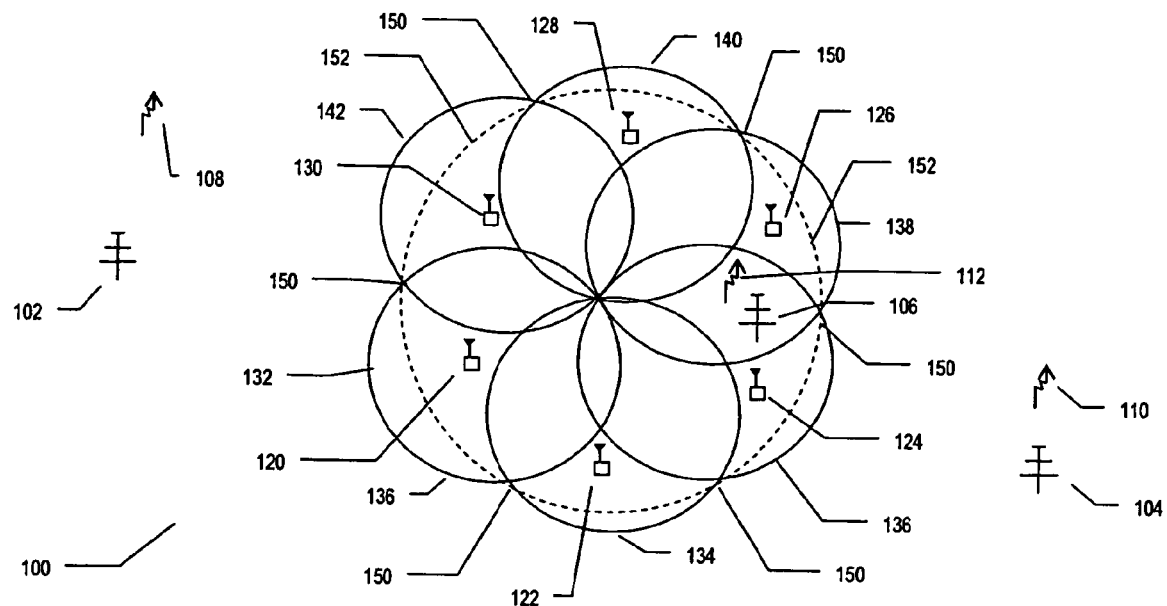
FIG. 1A illustrates a network of nodes having spectrum holes according to the disclosed embodiments.

FIG. 1A depicts a network 100 of nodes and spectrum holes according to the disclosed embodiments. Network 100 includes transmitters 102, 104 and 106 that emit signals 108, 110 and 112, respectively. Network 100 also includes nodes 120, 122, 124, 126, 128 and 130. Nodes 120-130 also may be known as transceivers that are able to transmit and receive signals. Within network 100, transmitters 102, 104 and 106 may be referred to as non-cooperative transmitters with regarding to nodes 120-130 because the nodes are not looking to receive or send signals to the transmitters. In fact, if transmitters 102, 104 or 106 are transmitting, then nodes, or transceivers, 120-130 are instructed to not activate or initiate a service.

Transmitters 102, 104 and 106 may be fixed and known, such as television or radio stations. Transmitters 102, 104 and 106 are allocated a spectrum frequency band and may be subject to government regulations, such as FCC regulations in the U.S. During operation, transmitters 102, 104 and 106 send a signal during a period of time. Because of the different locations of transmitters 102, 104 and 106, the received signals from a given transmitter varies significantly due to changes of position of a receiver, propagation loss, terrain, and other effects.

Nodes 120-130 are devices that include transceivers that seek to transmit and receive within a spectrum not being used by any transmitters within a certain area. Nodes 120-130 also may include other components usually associated with wireless devices, such as a display, keypad, antenna and the like. Nodes 120-130 may be next generation (XG) mobile devices that move around from location to location. Nodes 120-130 may move along a specific route or trajectory over a period of time. Transceivers within nodes 120-130 may perform signal processing to generate measurements at successive discrete positions within an area surrounding each node. The measurements relate to received signals from transmitters, such as transmitters 102, 104 and 106.

Still referring to FIG. 1A, an area of interest applicable to each node is shown with the respective node at its center. Thus, node 120 is within area 132, node 122 is within area 134, node 124 is within area 136, node 126 is within area 138, node 128 is within area 140, and node 130 is within area 142. Each area may correspond with an applicable radius desired by the node. The radius is adjustable according to a detection level of the transceiver within each node. For example, if nodes 120-130 are mobile devices carried by a soldier, then the radius for each node may be defined in meters. If nodes 120-130 are vehicles, then the radius for each node may be defined in kilometers (km).

Areas 132-142 also may be determined to include spectrum holes for nodes 120-130. A spectrum hole may be defined as an area with spectrum availability, or unused spectrum. Thus, for example, node 120 seeks to determine whether area 132 includes a spectrum hole. Node 120 may determine that interfering transmissions are being received within area 132, and, therefore, no spectrum hole exists.

A higher detection threshold for a transceiver generates a smaller area of interest, and, in turn, a smaller radius for a circle centered at the transceiver for the area of interest. Thus, a transceiver not having very good sensitivity will result in a smaller area of interest, and, in turn, a smaller spectrum hole. A low detection threshold results in greater sensitivity of being able to detect signals at larger distance from its transmitter such that it provides a larger area of interest. More sub-areas within the area of interest are updated with a measurement and a larger spectrum hole can be generated. Using the above example, a soldier on the ground may not have high sensitivity transceiver implying that the radius of the spectrum hole defined around its transceiver will not be very large. On the other hand, a highly elevated transceiver such as an aircraft, may see a larger spectrum hole. A better sensitivity, however, will enlarge the corresponding spectrum holes of the soldier or aircraft.

Figure 1B:
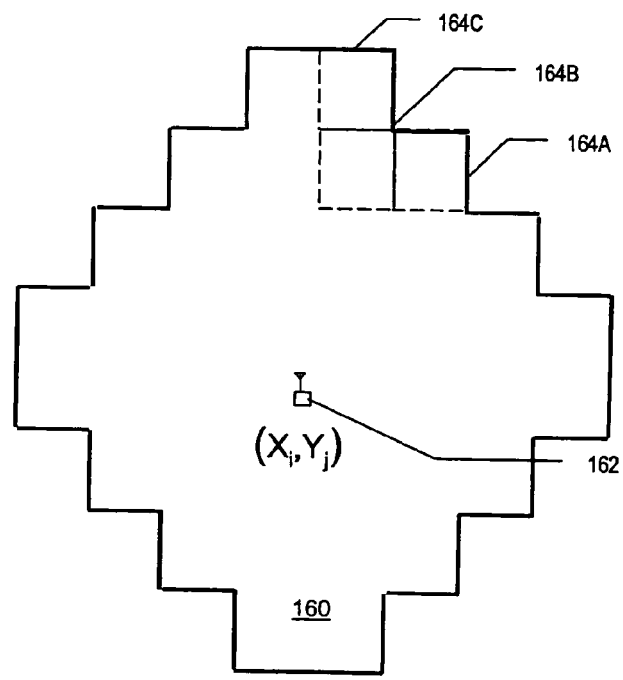
FIG. 1B illustrates a transceiver within a spectrum hole for a given area according to the disclosed embodiments.

The area "covered" by a node may not necessarily be in the shape of a circle. Referring to FIG. 1B, a transceiver 162 having an area 160 is shown. Area 160 includes a spectrum hole if transceiver 162 determines that no transmitters are operating within area 160 during a period of time. Area 160 also may be referred to as having more than one "cell" or a grid of cells having a specified size or area, such as 1 by 1 km². The grid covers a region of interest, or the given area, preferably within a radius determined by sensitivity of the transceiver. When used as a reference, the grid of cells, including an area such as area 160, is used to track and update information about the location of non-cooperative transmitters, such as transmitters 102-106, with evidence obtain by measurements at the nodes, such as transceiver 162.

The areas surrounding the nodes may be broken down further into smaller areas, or "cells," according to the present invention. The use of cells within a grid is desirable because the data regarding the area is digitized and subject to processing requirements and limitations. A node traveling through a cell may determine the status of that cell before determining spectrum availability for other cells within the area.

Thus, area 160 may resemble a plurality of squares that are combined to shape the area. The shape can be circular, as shown, or square, triangular, and the like. Each square may have a distance, or delta ($\delta$), that is used to locate the various cells within a grid from a reference point. The delta may be, for example, in meters, feet, kilometers, miles and the like. In addition, each cell is defined, such as cells 164A, 164B and 164C, within area 160. Referring to FIG. 1B, cells 164A, 164B and 164C are square in shape. Further, cells may include sub-cells that further define the shape of the cells.

Figure 1C:
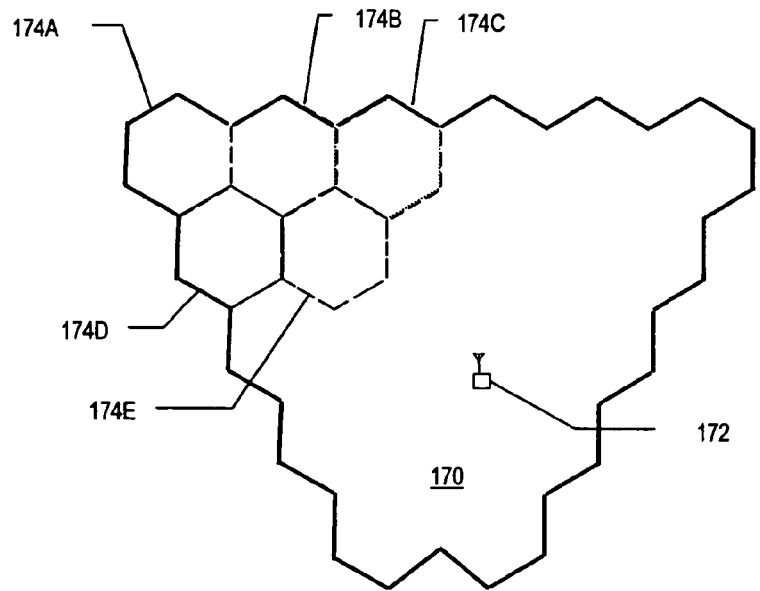
FIG. 1C illustrates a transceiver within another spectrum hole for a given area according to the disclosed embodiments.

Referring to FIG. 1C, area 170 has a shape different than area 160 of FIG. 1B. Transceiver 172 is located within area 170, preferably in the center. Area 170 is divided into cells, such as cells 174A, 174B, 174C, 174D and 174E. Additional cells make up area 170. When compared to cells 164A-C, cells 174A-E are different in shape or size. Thus, cells for use within the areas defined by the present invention may vary according to the desired size or shape. Additional shapes of cells may be applicable and the shapes are not limited by the examples given in FIGS. 1B and 1C.

Area 170 is triangular in shape. Thus, the area of interest around a node having a transceiver, such as areas 160 and 170, do not have to be circular in shape. The cells of the area may be combined in any fashion to define the given area. The cells are used by the present invention to determine the absence or presence of a NC transmitter.

Referring back to FIG. 1B, the location of transceiver 162 within the grid is designated by $x_i$, $y_j$. As a node moves within the grid over time, measurements are taken at successive positions. The position is indicated by $r_k$, where k refers to a discrete time instance, or value. For example, measurements are taken every 5 seconds as transceiver 162 moves along a road. Thus, the measurements correspond to discrete positions $r_k=(x_k,y_k)$, if indexed by k. The grid of square cells covering the region of interest is used to track and update the information about the locations of non-cooperative transmitters with the evidence obtained from each measurement.

Preferably, a plurality of transceivers will be in close proximity to each other so that each cell is cover by the radius of one or more transceivers. Thus, the transceivers are spaced apart to allow for some overlapping of areas of interest. Further, the transceivers are synchronized in the sense that they all take their measurements on or about the same time.

Moreover, area 160 comprises one of several areas within a larger area of interest. Information regarding the grid cells within area 160 is forwarded to another location, such as a central processing location, to be combined with information from the other transceivers. The combined information is used to define an even larger spectrum hole, one that might include area 160. In fact, area 160 may be considered a "grid cell" of the larger area, and treated as such in determining spectrum availability.

Referring back to area 160, the location information about the non-cooperative transmitters within each cell of the grid is maintained through three indicators: belief, disbelief and ignorance. Belief refers to the presence of a transmitter within the cell. Disbelief refers to the absence of a transmitter within the cell. Ignorance refers to the fact that not enough evidence exists about whether a non-cooperative transmitter is within the cell. The belief, disbelief and ignorance values are used for each grid cell to map a potential spectrum hole.

A mathematical framework for the grid representation of the cells is described as $S_{i,j}$. Thus, the set of grid cells are denoted by $S_{i,j}=(u_i, u_i+\delta)\times(v_j, v_j+\delta)$, where $u_i=u_0+i\delta$ and $v_j=v_0+j\delta$, and where $\delta$ is the size of the cell square for area 160. For example, the location $x_0$, $y_0$ is in the bottom left corner of a map or region of interest. Another user or transceiver also may take measurements at the same or different positions over time for the same set of grid squares.

A matrix may be compiled of the grid cells and their values. The matrix includes all the grid cells within area 160. Because area 160 is defined by a radius defined by transceiver 162, the number of grid cells within the matrix should correspond to the desired size of a spectrum hole. Further, a larger area of interest results in a greater number of grid cells. The size of the grid cells is adaptive depending on the situation calling for spectrum availability, and is responsive to the detection threshold and sensitivity of transceiver 162.

By taking consistent measurements over a period of time, transceiver 162 determines accumulated belief, disbelief and, if applicable, ignorance values for each grid cell. A snapshot of the grid cells at any instance in time gives a good indication whether spectrum availability exists for the area of interest around transceiver 162. These values are not limited to information from transceiver 162, and the belief, disbelief and ignorance values are updated by information for measurements taken by other transceivers that include the grid cell. Thus, each grid cell provides the probabilities having more confidence if overlapped by transceivers.

For example, transceiver 162 samples the power level in a channel over a period of time, such as several minutes. During this period, all non-cooperative transmitters within the region most likely have sent some data. Because of the different locations of the transmitters, changes in positions and other effects, the received signal levels from a specific transmitter should vary significantly. Transceiver 162 determines the maximum received signal level, or P(measured), from a transmitter from the measurements during a certain interval. The level preferably is expressed in dBm.

The minimum propagation loss from the transmitter to transceiver 162 is determined by subtracting a transmitter's transmission power level, or P(transmitter), from the maximum received power level, or P(measured). The transmission power level may be taken from known sources, such as Federal Communication Commission (FCC) records, while the received power level may be measured from the incoming signal. After the estimation, the maximum allowable node power, or P(max Tx) is calculated as:

$$P(\max Tx)=P(\text{allowable interference})+P(\text{transmitter})-P(\text{measured}). \quad \text{(Equation 1)}$$

The allowable interference also is provided from the FCC or other sources that set the level of interference allowed for the region of interest. The allowable interference also may be related to the amount of interference allowed for a specified spectrum.

Transmitter power level values for non-cooperative transmitters, or P(transmitter), in the region can be derived or obtained, as noted above, via government standards, a database, estimations for records, and the like. The mechanism for generating the transmitter power level depends on the allocated spectrum band, which may be via the FCC regulations, from the spectrum owner directly as part of a leasing arrangement, or from a government database such as the NTIA Government Master File (GMF) of frequency assignments or the Department of Defense Joint Spectrum Center's Equipment Characteristics and Space (EC/S) file.

Referring back to FIG. 1A, nodes 120-130 are used to take measurements and estimate propagation loss of the received power level of signals. Using these results, the measurements taken at the nodes are combined, or fused, according to group behaviors. Group behaviors use collective results of measurements from multiple transceivers, such as nodes 120-130, to determine the existence of a spectrum hole without causing significant interference to non-cooperative users or transmitters.

Group behaviors also enable a system or network of transceivers to operate with a higher maximum interference free transmit power (MIFTP) when compared to single node behaviors, as discussed above. For example, if all the grid cells within areas 132-142 indicate spectrum availability, then the maximum power can be set higher at a node because it will not interfere with transmitters even outside its area of interest.

An aspect of the group behavior is determining what areas do not contain non-cooperative transmitters. No signal detection above the noise level of a transceiver within any of nodes 120-130 potentially indicates a spectrum hole centered at the transceiver's location. Alternatively, a signal measured at a certain level furnishes a probabilistic location area for a non-cooperative transmitter. Any applicable radius of the area for making the determination may depend on assumed values for non-cooperative antenna heights, transmitter power and terrain conditions and type.

Using group behaviors, probable non-cooperative transmitters are located using distributed spectrum measurements, such as the measurement of received signal power discussed above. Propagation loss distribution functions are used along with a location of a node to determine the MIFTP allowable to avoid significant interference. Propagation loss occurs to a signal as it travels over a distance for a specified amount of time. The amount of propagation loss may vary according to different factors, such as weather, terrain, humidity, temperature and the like. The amount of loss, however, can be made a function of the distance that a signal has traveled. Upper and lower limits may be set as to the amount of loss the signal will experience for best and worst case scenarios. Thus, given the transmission power level of a transmitter and a received power level of the signal, the amount of propagation loss correlates to the distance of the transmitter from the transceiver.

Given a propagation loss, or $L_k$, at time k, the probability, or $q_{i,j}$, that a primary transmitter, such as one of transmitters 102, 104 and 106 in FIG. 1, belonging to a grid cell of coordinates i, j and size δ within a matrix of grid cells can be expressed as:

$$q_{i,j}(L_k,H,h,f,\delta)=Pr\{\hat{R}\in S_{i,j}|L,H,h,f,\delta\}, \quad \text{(Equation 2)}$$

where $L_k$ refers to propagation loss at time k, H represents the height of a transmitter in meters, h represents the height of the transceiver, or node, in meters, f represents the carrier frequency in megahertz (MHz), Pr represents the probability all the above things will happen, while R represents the distance traveled by the signal from the transmitter to the grid cell and S is the measured power level. For Equation 2 above, each of the parameters of received power $P_r$, H and h may be characterized by histograms or requirements from Federal Communications Commission (FCC) or Joint Spectrum Center databases. Thus, given a received power level, or $P_r$, the present invention obtains a set of marginal probabilities, or $q_{i,j}$, for the grid cells within an area of interest based on the histograms of the parameters of the transmitters or:

$$\tilde{q}_{i,j}(k\,|\,P_r,\delta) = Pr\{\hat{R}\in S_{i,j}\,|\,P_r,\delta\} \quad \text{(Equation 3)}$$
$$= \sum_H \sum_h \sum_{P_t} q_{i,j}(P_t - P_r, H, h, f, \delta) \cdot$$
$$\text{hist}(H)\cdot \text{hist}(h)\cdot \text{hist}(P_t),$$

where k represents the discrete time instance of the measurement, $P_r$ represents received power, δ represents the distance value of the grid cells, Pr represents the probability all the above things will happen, R represents the distance from a transmitter to the grid cell (shown in Equation 3 as a vector), $S_{i,j}$ represents the measured power level in a grid cell i,j, $P_t$ represents transmitter power, H represents transmitter height, h represents transceiver height, and f represents the frequency bandwidth.

Using the probabilitistic description shown above, the spectrum availability for a grid cell, for example, generated by LBT is represented. The spectrum hole, however, only may be valid during the LBT step it is generated and corresponds to the current measurement. The present invention, however, accumulates present and past indicators for measurements associated with the probability of a spectrum hole in a grid cell to determine a spectrum hole, instead of discarding the information of the grid cell square.

Using the LBT method, the LBT algorithm determines a circular spectrum hole having a distance percentile radius that is centered at the node location, or $x_i$, $y_j$. The spectrum hole remains constant and changes its location along the movement route or trajectory where the measurements are taken. The information of the grid cells obtained with previous measurements is accumulated instead of being discarded. The accumulated information is used to determine a spectrum hole having the grid cells using the belief and disbelief determined for the grid cells at each node 120-130.

Using the group behavior relationships, information is used from multiple nodes to determine a larger spectrum hole. For example, an applicable algorithm for group behavior is the Dempster Shafer Theory (DST). DST is a mathematical theory of evidence based on belief functions and plausible reasoning, which is used to combine separate pieces of information, or evidence, to calculate the probability of an event. DST allows a consideration of the confidence one has in the probabilities assigned to each outcome. Another applicable algorithm may be the Bayesian algorithm for group behavior determinations. The present invention is not limited, however, to a specific algorithm or theory for group behavior determinations.

DST is a generalization of subjective probability. According to DST, belief functions base degrees of belief, confidence or trust for one question on the probabilities for a related question. The degree of beliefs may or may not have the mathematical properties of probabilities. How much a degree of beliefs differs from other degrees of belief may depend on how closely the two questions are related.

DST may be used as a process for group behavior fusion because it is based on obtaining degrees of belief for one question from subjective probabilities for a related question along with Dempster's rule for combining such degrees of belief when they are based on independent items of evidence. A degree of belief is represented as a belief function rather than a probability distribution. Probability values are assigned to sets of possibilities rather than single events.

According to embodiments of the present invention, three belief assignment indicators are defined for each cell square, such as 164C in FIG. 1B. A belief indicator, or $B_{i,j}(k)$, represents the cumulative belief that there is a transmitter in cell (i,j) at time k using an instantaneous belief value and accumulated belief values. A disbelief indicator, or $D_{i,j}(k)$, represents the cumulative disbelief that there is not a transmitter in cell(i,j) at time k using an instantaneous disbelief value and accumulated disbelief values. An ignorance indicator, or $I_{i,j}(k)$, represents the ignorance that there is no evidence to make a spectrum classification at time k. The indicators and the manner they are generated are disclosed in greater detail below.

Once the absence or presence of transmitters is determined within a grid cell, the resulting determinations are used to combine spectrum availability from other grid cells to form a spectrum hole that allows power to be used with confidence that services will not interfere with existing transmissions. As shown in FIG. 1A, areas 132-142 overlap such that the spectrum holes on various channels or frequency bands of the nodes overlap as well and spectrum hole 150, shown by dashed line 152, may be estimated. Dashed line 152 connects the intersections of areas 132-142 to provide the boundary for spectrum hole 150. Spectrum hole 150 is comprised of all the grid cells within areas 132-142 that are indicated as having spectrum availability.

Due to the size of spectrum hole 150, a transceiver within its area is able to transmit at a higher power level without fear of interference by non-cooperative transmitters, such as transmitters 102, 104 or 106. Transmitters 102 and 104 are outside spectrum hole 150, while transmitter 106 is down or not operative. Further, a transceiver, or node, could move within spectrum hole 150 with the confidence that any transmissions will not interfere with non-cooperative transmitters.

Center node 170 represents a central location within spectrum hole 150. Nodes 120-130 may report to center node 170. Information regarding belief, disbelief and ignorance of transmitters within spectrum hole 150 is provided to center node 170 from nodes 120-130. Center node 170 can combine this information to determine spectrum hole 150, or may use its own algorithms or methods to process the information in forming spectrum hole 150. Preferably, center node 170 requires a larger spectrum hole than nodes 120-130 and is able to operate at higher power levels. For example, if nodes 120-130 are soldiers having mobile phones, then center node may be a vehicle having more sensitive transmission equipment. Further, the vehicle moves faster than a soldier and needs a larger spectrum hole.

Figure 2A:
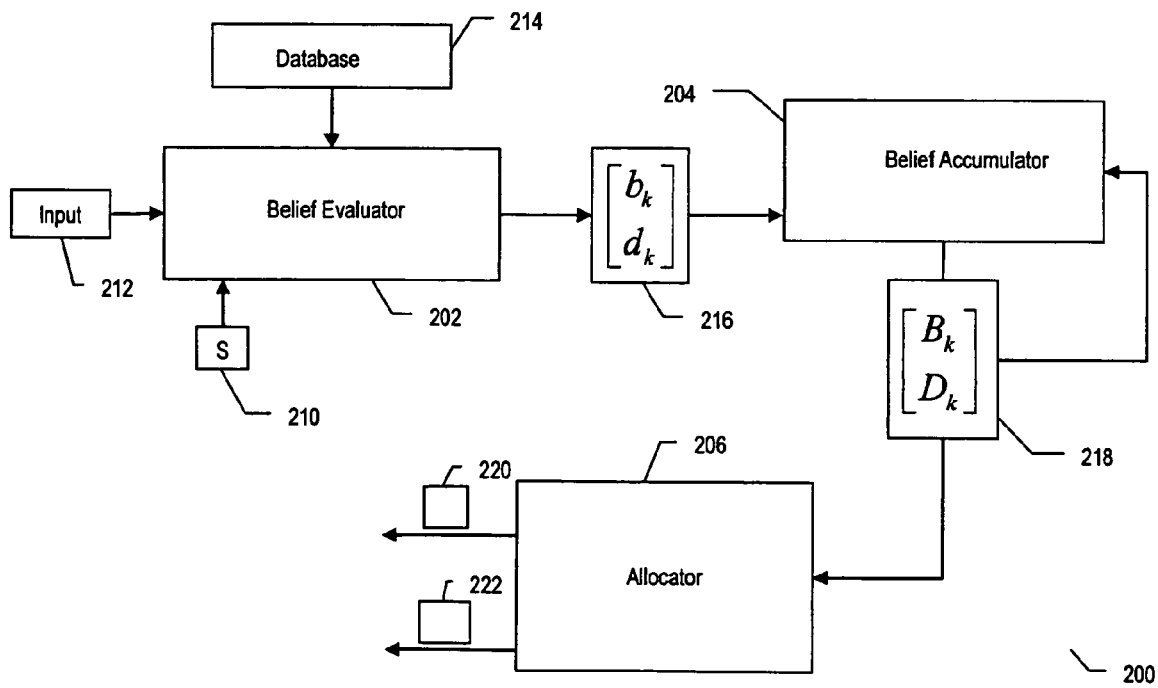
FIG. 2A illustrates a block diagram of a device to determine spectrum availability according to the disclosed embodiments.

FIG. 2A depicts a block diagram of a transceiver 200 to determine spectrum availability according to the disclosed embodiments. Transceiver 200 includes belief evaluator 202, belief accumulator 204 and allocator 206. The components of transceiver 200 may be implemented as software programs, using code, modules, objects and the like, to provide the functionality disclosed below. Any programs to support belief evaluator 202, belief accumulator 204 and allocator 206 may be stored on transceiver 200, or, alternatively, stored in an accessible memory that runs the programs when prompted by transceiver 200 or the node encompassing transceiver 200.

Using these features of transceiver 200, the embodiments of the present invention determines the presence or absence of a non-cooperative transmitter for a given area. The determination is based on parameters for the group behavior as estimated from previous measurements. The parameters related to a radius centered on transceiver 200. Within the radius, transceiver 200 may be able to make determinations about the belief or disbelief of the presence of a non-cooperating transmitter.

Various parameters are identified for discovering transmitter location and presence. The parameters may be based on received signal strength measurements by multiple nodes at multiple locations. Other parameters may be set beforehand by restrictions or standards. Parameters also may be set by the devices themselves, such as height.

Four parameters are used for determining the instantaneous belief and disbelief, also referred to as dubiety, a transmitter is operating in the grid cell. The four parameters are associated with the propagation loss distribution function to determine the applicable radius to be used in comparing the measurement results from the received signal. A fifth parameter may be the acceptable deviation from the upper and lower limits of the propagation loss distribution function used to determine some of the four parameters. The parameters are disclosed in greater detail with reference to FIGS. 2B and 2C.

One parameter is the detection threshold of transceiver 200. The detection threshold correlates to the level of a received signal desired to be above the noise level of transceiver 200. Any received signal below the detection threshold may or may not be noise, and, therefore, may not be suitable for estimating the presence of a transmitter. As disclosed above, the detection threshold is adjustable according to the sensitivity and needs of transceiver 200. A high threshold may be applicable in devices or transceivers not having very good sensitivity, and may not be able to separate low level signals from noise. The high threshold results in a smaller radius available for spectrum availability processing. A low threshold may be applicable in devices or transceivers having good sensitivity and able to separate low level signals from noise. A larger radius will be available to these devices for spectrum availability determinations.

For example, a soldier on the ground may not have a need for a large radius for spectrum availability determinations. Buildings, terrain, speed, conditions and the like reduce the need for a large spectrum hole. Thus, the transceiver does not have to be as sensitive and may have a higher detection threshold than one on an airplane. The transceiver on the airplane should not be subject to the limitations of a soldier on the ground, and, because of its trajectory and speed, could use a larger spectrum hole. Thus, the radius desired by the airplane is larger to include a greater number of grid cells.

Another parameter is the disbelief update radius with a negative reading (DubRadNR). A negative reading occurs with the power level of the received signal is below the detection threshold. For example, received signals having power levels below the detection threshold may not be determined with any certainty to be a signal instead of noise. Because the power level probably does not correspond to a signal, the probability, and the belief of a transmitter is within the area are very low or even zero (0). Thus, a negative reading indicates that there is very little or no belief of the presence of a transmitter within the grid cell.

The disbelief of a transmitter being within the grid cell, however, may be important during a negative reading. A probability also may be attached to the measurement that a transmitter is not within the area, or, in other words, the disbelief of the presence of a transmitter. For example, in order to be able to transmit, the disbelief of the presence of a transmitter should be very high, or one (1). A high probability of disbelief indicates that there is probably not a non-cooperating transmitter within the grid cell. The DubRadNR parameter helps to determine the disbelief probability.

Other parameters include the belief update radius with a positive reading (BelRadPR) and the disbelief update radius with a positive reading (DubRadPR). A positive reading occurs when the power level of the received signal is above the detection threshold. The positive reading differs from the negative reading because a probability may be attached to signify the presence of a transmitter. Thus, the positive reading parameters are generated to help determine the probabilities.

With the exception of detection threshold, the parameters disclosed above provide a value for a radius extending from the node, or location of transceiver 200, to define, with a level of confidence, an area that the transmitter may or may not be present. Thus, within the radius of the specific parameter, the present invention should conclude whether or not a value can be applied to the presence or absence of a non-cooperating transmitter.

Outside of the radius of the specific parameter, the presence or absence of the transmitter may not be determinable. In these instances, it may be said that the information from the received signal is not enough to make any conclusion as to spectrum availability, and that transceiver 200 is ignorant. Further, a radius of a parameter disclosed above encompasses at least one grid cell. Preferably, the radius encompasses a plurality of grid cells such that determinations about the presence or absence of a non-cooperating transmitter are applied to these grid cells.

Figure 2B:
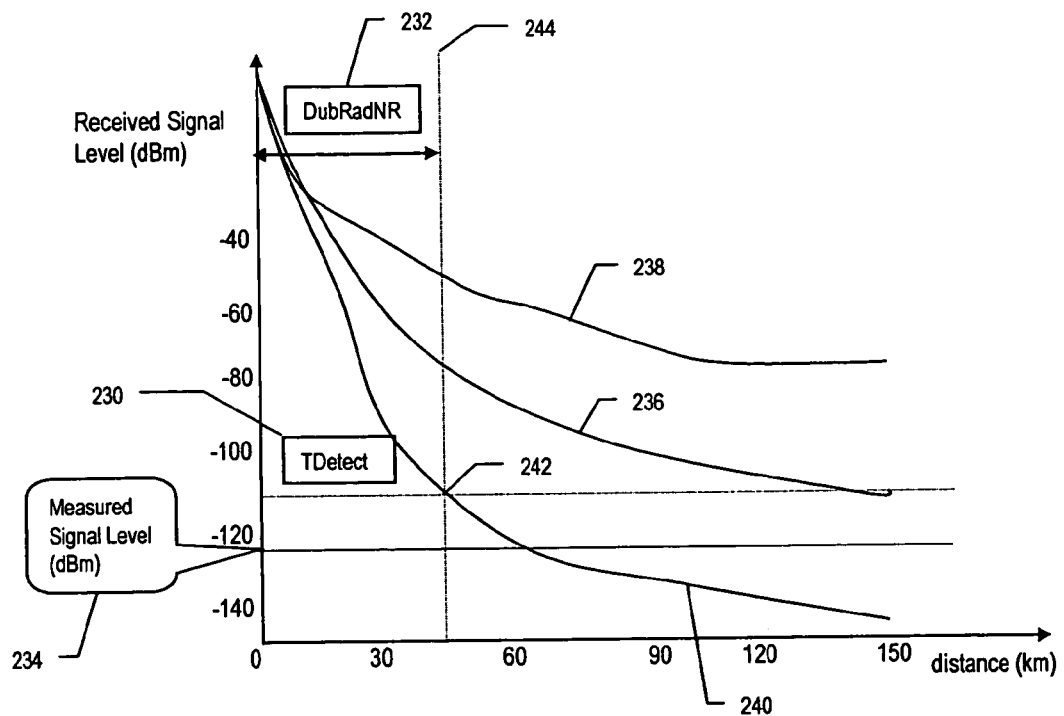
FIG. 2B illustrates a graph showing propagation loss over distance and the algorithm parameters for a negative reading according to the disclosed embodiments.

FIG. 2B depicts a graph showing propagation loss over distance for a negative reading according to the disclosed embodiments. The y-axis shown in FIG. 2B is referred to as the propagation loss of signals from a transmitter in dBm, while the x-axis is referred to as the distance, in kilometers, from transceiver 200 to the transmitter. This distance also may be referred to as line distance. A negative reading results when the measured power level of a potential signal is below the detection threshold, or TDetect. In FIG. 2B, detection threshold 230 is shown extending at about −110 dBm propagation loss for measured signal level 234.

Detection threshold 230 extends along the distance axis in a line positioned at about −110 dBm for propagation loss. Detection threshold 230 stays the same value along the distance axis. Measured signal level 234 is below detection threshold 230. Because of the negative reading, the parameter for a disbelief update radius with a negative reading, or DubRadNR, 232 is determined. In this instance, belief accumulator 204 will update a disbelief assignment for the grid cells encompassed by the radius. Thus, the received signal with a negative reading may be indication of a spectrum hole in those grid cells.

The propagation loss distribution is shown by lines 236, 238 and 240. Lines 236, 238 and 240 set the boundaries of applicable propagation loss that will impact the determination of a spectrum hole. Line 236 relates to the median of the propagation loss distribution function for transceiver 200. In other words, line 236 may represent the average value of the propagation loss over a range of distances. Line 238 is the upper boundary and line 240 is the lower boundary of the propagation loss distribution function.

Lines 238 and 240 correspond to percentiles of the function. For example, line 238 corresponds to the ($\alpha/2$) percentile of the distribution, where $\alpha$ is distance percentile defined by transceiver 200. The distance percentile is imposed or set by system or device requirements. Line 240 corresponds to the ($1-\alpha/2$) percentile of the distribution. For example, line 238 may represent a 1% loss of the signal, while line 240 represents a 99% loss with a being set at 2%. Line 238 would be the propagation loss under the best of circumstances, where a signal retains 99% of its original power level over a distance. Conversely, line 240 represents the worst circumstance, where a signal only retains about 1% of its signal power over a distance.

With received signal level 234 below detection threshold 230, line 240 represents a worse case scenario and is used to determine DubRadNR 232. At the intersection of the line for detection threshold 230 and line 240, or intersection 242, the value of DubRadNR 232 is determined. Line 244 extends for the distance axis along the propagation loss axis. Referring to FIG. 2B, the value of the parameter, or DubRadNR 232, is about 45 km. The parameter is used later for comparison purposes. Thus, grid cells within this radius may be subject to updates regarding their cumulative disbelief values.

Figure 2C:
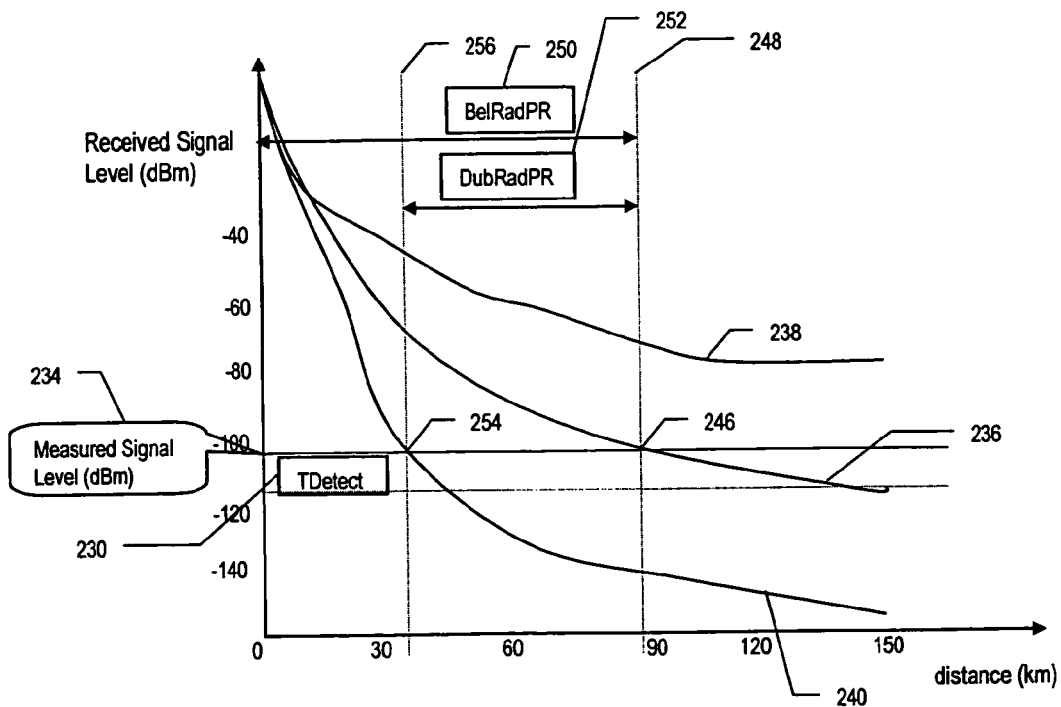
FIG. 2C illustrates a graph showing propagation loss over distance and the algorithm parameters for a positive reading according to the disclosed embodiments.

FIG. 2C depicts a graph showing propagation loss over distance for a positive reading according to the disclosed embodiments. The axes are the same as those for the graph in FIG. 2B. Further, the same propagation loss distribution function as FIG. 2B is shown by lines 236, 238 and 240. Detection threshold 230 is at about -110 dBm propagation loss.

Received signal level 234, however, is above detection threshold 230. Received signal level 234 is about -100 dBm propagation loss. Thus, a positive reading is determined. For a positive reading, a desired parameter is a belief update radius with a positive reading, or BelRadPR, 250. Belief accumulator 204 updates a belief assignment for the grid cells within the belief radius. Another desired parameter is a disbelief update radius with a positive reading, or DubRadPR, 252. Belief accumulator 204 updates a disbelief assignment for the grid cells within the disbelief radius. Further, BelRadPR 250 and DubRadPR 252 are used for comparison purposes in determining the presence or absence of a transmitter.

Referring to FIG. 2C, the parameters are defined by the intersections of lines 236 and 240 with received power level 234. As noted above, line 236 relates to the median of the propagation loss distribution function, while line 240 relates to the lower boundary of the function. Intersection 246 indicates where line 236 intersects received signal level 234. Intersection 254 indicates where line 240 intersects received signal level 234. Intersection 246 also indicates where line 248 is positioned. Line 248 represents the value for parameter BelRadPR 250. For example, BelRadPR 250 has a value of about 88 km as shown in FIG. 2C.

Intersection 254 shows where line 256 is located, which helps to determine the value of DubRadPR 252. Intersection 254 is not the same as intersection 242 shown in FIG. 2B because intersection 254 relates to received power level 234 instead of detection threshold 230. DubRadPR 252 is defined as the value between lines 256 and 248. For example, DubRadPR 252 has a value of about 55 km as shown in FIG. 2C.

Because some of the parameters rely upon whether the received signal is above or below the detection threshold, not every parameter will be applicable or used for every belief or disbelief estimation. For example, if the signal level is below the detection threshold, then the status is known as a negative reading, as discussed above. If the signal level is above the detection threshold, then the status is known as a positive reading. A positive reading may indicate that a transmitter is transmitting signal within the grid cells of the given area.

Further, as shown in FIGS. 2B and 2C, the intersections of the detection threshold or the received power with the various propagation loss distribution function values define areas where probabilities may be attached to the belief or disbelief that a transmitter is operating within a given area, such as a grid cell. Referring to FIG. 2B, intersection 242 of detection threshold 230 and line 240 indicates the point where a received signal would suffered so much propagation loss that a disbelief probability cannot be given with any amount of confidence. A signal from a distance over 45 km should not be detectable or pose any threat of interference according to FIG. 2B. Conversely, if the signal is transmitted over a distance less than 45 km, then the possibility exists that interference will occur within the grid cell. The measurement is treated as a positive reading, as disclosed below.

Referring to FIG. 2C, the radius of the areas for belief and disbelief are defined at 88 km and 55 km, respectively. Received signal level 234 intersects with line 236 at intersection 246 to define the point where a value can be assigned to the belief of a presence of a transmitter with confidence. The upper value may be adjustable, such as line 238, but associating intersection 246 with the median of the propagation loss provides better confidence and lesser chance of false alarms. The disbelief is limited to the area between lines 256 and 248 because any distance closer to the node must result in a higher power level for the received signal, and, thus, a presence of a transmitter.

Other parameters are defined for use within transceiver 200, as disclosed below. The four parameters (detection threshold, DubRadNR, BelRadPR and DubRadPR) disclosed by FIGS. 2B and 2C, however, are not given by system specifications or design considerations, and may vary between transceivers according to location and received signal strength. Parameters disclosed below also may vary or may be defined according to other criteria than propagation loss, signal strength and the like.

Referring back to FIG. 2A, belief evaluator 202 defines belief indicators for each grid cell within the defined radius for an instantaneous measurement taken at a discrete point in time, or k. Instantaneous belief indicators, or $b_{i,j}(k)$, are generated that represent the belief at time k that a transmitter is within the grid cell having its center coordinates as $(x_i, y_j)$. Instantaneous disbelief indicators, or $d_{i,k}(k)$, also are generated that represent the dubiety, or disbelief, at time k that a transmitter is not within the grid cell having the center coordinates $(x_i, y_j)$. As disclosed above, the grid cells may be arranged in a matrix, where the matrix is filled with instantaneous belief and disbelief values.

Belief evaluator 202 also receives information in generating, the instantaneous belief and disbelief indicators. One piece of information is a new measurement from a signal received at transceiver 200. As noted above, the new measurement may be referred to as $S_k$, for a discrete time instance, or k.

Inputs 212 also are received at belief evaluator 202. Inputs 212 contain various input values or parameters. The inputs include non-cooperative transmit power, in DBW of non-node users. This input may be common for all non-cooperative nodes, or transceivers. As discussed above, the height of the non-cooperative transmitter, or H, in meters (m) and the height of the transceiver, or h, in meters (m) also are considered for the belief and disbelief indicators. Other parameters include carrier frequency, or f, identified by MHz, and the non-cooperative antenna gain, or G, in dB. The frequency bandwidth, or b, in MHZ and the signal to noise ration (SNR) for the non-cooperative network in dB also are included.

Other information within inputs 212 may include the height and gain of the node, or of transceiver 200. A probability of interference limit is specified. The limit, for example, is 0.01, or 1%. The detection threshold, as disclosed above, also is set within inputs 212 along with interference to noise ratio of about −6 dB. The detection threshold also is referred to as the sensing threshold.

Inputs 212 also include the longitude and latitude of the bottom left corner of the map, or region of interest, in degrees. This location can be the reference point for the grid cell, or $x_0$, $y_0$. The size of the cell in degrees also is specified. The non-cooperative transceiver, or node, antenna polarization is specified, for example, with 0 being given for horizontal and 1 being given for vertical. Terrain type also is given in inputs 212 as different types of terrain impacts the signals and their values along with the nodes, or transceivers, ability to receive the signals. Different terrain types are defined for identification, such as sea water, marshy land, average terrain, plains, desert and the like. The location of transceiver 200, is designated by $x_i$ and $y_j$, as disclosed above.

Figure 5:
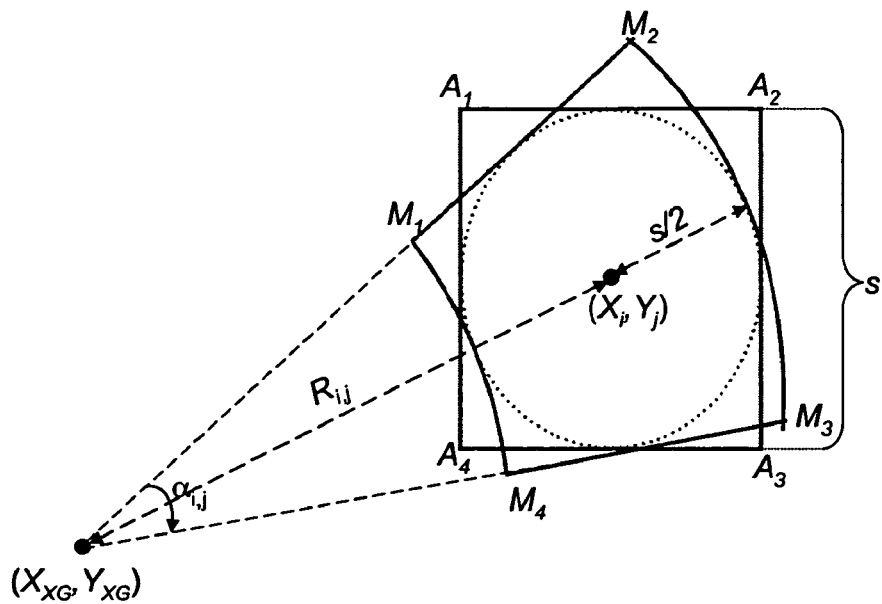
FIG. 5 illustrates a diagram for showing an approximation of the probability of a transmitter within a square cell according to the disclosed embodiments.

Database 214 also is available to belief evaluator 202 to provide base or initial information on transmitters, frequencies, and the like. Further, some of the features disclosed with reference to inputs 212 may alternatively be found in database 214. Belief evaluator 202 also may not be connected to database 214 except under certain circumstances. If transceiver 200 moves from place to place, then it may not have the opportunity to connect to database 214 while performing the generation of the indicators. Within belief evaluator 202, the probabilities or $q_k(i,j)$ of a non-cooperative transceiver within the grids centered at the coordinates $x_i$ and $y_j$ at discrete time instance k, are first determined by the following expression (The expression is further developed under the assumption that the shadowing component of the median propagation loss is Gaussian N(0,σ)):

$$q_{i,j}(k) = \frac{\theta_{i,j}(k)}{2\pi}[CDF_L(g(R_{i,j}(k))) - CDF_L(g(r_{i,j}(k)))] \quad \text{(Equation 3)}$$

$$= \frac{\theta_{i,j}(k)}{2\pi}\left[Q\left(\frac{g(R_{i,j}(k)) - L(k)}{\sigma}\right) - Q\left(\frac{g(R_{i,j}(k)) - L(k)}{\sigma}\right)\right],$$

for any k=1, 2, . . . .
where $\theta_{i,j}(k)$ is the angle under which the node sees at discrete time instant, k, the inscribed circle of the grid square centered at (xi,yj) coordinates as it is shown in FIG. 5; L(k) is the median path loss between the node and the non-cooperative transmitter at time instant k; □ is the standard deviation of the propagation loss fluctuations at time instant k; g(.) is a formula, which provides an inverse solution for the median propagation loss as a function of distance, such as Empirical Propagation Model, or EPM73 (M. N. Lustgarten and J. A. Madsen, \An Empirical Propagation Model (EPM-73)," *IEEE Trans. on Electromagnetic Compatibility*, vol. 19, August 1977), Okumura Hata Model (J. W. Mark, W. Zhuang, "Wireless Communications and Networking," Pearson Education, Inc., 2003, Upper Saddle River, N.J.) (T. S. Rappaport, "Wireless Communications, Principles and Practice," Pearson Education, Inc., 2002), or Cost 231, JTC Model, and the like; $CDF_L(x)$ represents the Cumulative Distribution Function of the propagation losses; $r_{i,j}(k)$ and $R_{i,j}(k)$ are the radii of the tangent smaller and larger circles, respectively, which are tangent to the inscribed circle of the grid square centered at $(x_i,y_j)$ coordinates; and $$Q(x) = \frac{1}{\sqrt{2\pi}} \int_x^\infty \exp\left(-\frac{t^2}{2}\right) dt$$

is the error function.

Assuming that the shadowing component is Gaussian N(0, σ), and the values of inputs 212 are defined, belief evaluator 202 computes the probabilities, $q_{i,j}(k)$, given in Equation 3 above. A plot of the probabilities, $q_{i,j}(k)$ would form a thorus centered in the location of transceiver 200 for a propagation loss. Using the values for $q_{i,j}(k)$ defined by the equation, belief evaluator 202 can assign instantaneous belief, or $b_{i,j}(k)$ and the instantaneous disbelief, or $d_{i,j}(k)$ to each grid cell for a measurement. The instantaneous ignorance, or $i_{i,j}(k)$, to each grid cell for a measurement is given by (For simplicity purposes, throughout this document, the description will sometimes omit the indices i and j of each grid cell. The description will simply use $b_k$, $d_k$ and $i_k$ for instantaneous belief, disbelief, and ignorance indicators, respectively)

$$i_{i,j}(k)=1-b_{i,j}(k)-d_{i,j}(k).$$

Belief evaluator 202 uses the parameters disclosed above to determine the values assigned to the instantaneous belief, or $b_k$, and disbelief, or $d_k$, indicators for grid cell at location i,j. If the new measurement, or $S_k$, is equal to or less than the detection threshold, then the instantaneous belief value, or $b_k$ is 0 for grid cell i,j, and the instantaneous disbelief value, or $d_k$, is 1−α/2 for all the grid cells with the centers lying inside the circle of the disbelief update radius for a negative reading, or DubRadNR 232, and is 0 otherwise, as disclosed above. The ignorance is given by $i_k=1-b_k-d_k$.

If the new measurement is greater than the detection threshold, then belief evaluator 202 updates the instantaneous belief for the grid cells centered within the distance from the node given by belief update radius with a positive reading, or BelRadPR 250, and updates the instantaneous disbelief for the grids cells with the centers within the circle centered at the position of the node and the radius of the update radius with a positive reading, or DubRadPR 252. Depending on the outcomes of the comparisons, the instantaneous belief, disbelief and ignorance indicators are assigned accordingly. The process and functions used in belief evaluator 202 are disclosed in greater detail below.

Belief evaluator 202 outputs values for internal information within transceiver 200. Referring to FIG. 2A, output 216 includes the assigned instantaneous belief, disbelief, and ignorance indicators, or $b_k$, $d_k$, and $i_k$, respectively, for each grid cell within a radius defined above with regard to the parameters. Output 216 also includes the size of a area with the grid cells at discrete time instance k, or $N_k$, that is centered at the location of the node. Belief accumulator 204 updates the belief, disbelief and ignorance levels, or $B_k$, $D_k$, and $I_k$, using this value, respectively. The parameter, $N_k$, is a non-negative integer updated with each sensing position. Transceiver 200 retrieves a distance percentile and then divides this value with the grid cell size. Outside the local area, the belief, disbelief and ignorance levels remain unchanged. Output 216 also includes the longitude and latitude of the bottom left corner of the local area.

Output 216 is received by belief accumulator 204. Belief accumulator 204 applies the group behavior function to the received information from belief evaluator. Instantaneous belief, disbelief and ignorance indicators, or $b_k$, $d_k$, and $i_k$, respectively, are aggregated recursively in the cumulative mass belief assignments of belief, disbelief and ignorance, or $B_k$, $D_k$ and $I_k$, respectively. Belief accumulator 204 uses the following equations to perform this action:

$$B_k = C_k \cdot \{B_{k-1} b_k + B_{k-1} i_k + I_{k-1} b_k\} \quad \text{(Equation 4)}$$
$$D_k = C_k \cdot \{D_{k-1} d_k + D_{k-1} i_k + I_{k-1} d_k\}$$
$$I_k = C_k \cdot I_{k-1} i_k$$

where $$C_k = \frac{1}{1 - B_{k-1} d_k - B_{k-1} d_k}. \quad \text{(Equation 5)}$$

and $$B_0 = 0, D_0 = 0, I_0 = 1,$$

Another set of equations may be given for DST fusion according to the matrix below:

$$\begin{bmatrix} B_k \\ D_k \end{bmatrix} = \quad \text{(Equation 6)}$$

$$\left( \begin{bmatrix} 1-d_k & 0 \\ 0 & 1-b_k \end{bmatrix} \begin{bmatrix} B_{k-1} \\ D_{k-1} \end{bmatrix} + (1 - B_{k-1} - D_{k-1}) \begin{bmatrix} b_k \\ d_k \end{bmatrix} \right) \cdot$$

$$\frac{1}{1 - B_{k-1} d_k - D_{k-1} b_k},$$

where, $$\begin{bmatrix} B_0 \\ D_0 \end{bmatrix} = \begin{bmatrix} 0 \\ 0 \end{bmatrix}, I_0 = 1, 0 \leq b_k, d_k \leq 1$$

such that $$0 \leq b_k + d_k \leq 1, i_k = 1 - b_k - d_k, \text{ and}$$

$$I_k = 1 - B_k - D_k.$$

Belief accumulator 204 determines the values for the grid cells in the matrix for belief and disbelief based on the above relationships, or $B_k$, $D_k$, and $I_k$, respectively. After the values are determined, the accumulated values of previous measurements are updated with the new values of belief, disbelief, and ignorance so that the overall history of the belief of a presence or absence of a transmitter within the given area, such as a grid cell, may be recorded. Referring back to belief evaluator 202, if no signal is received by transceiver 200, then evidence or updates probably do not exist for the cumulative values in belief accumulator 204, unless certain conditions are met. If a signal is received, then belief accumulator 204 is activated and the cumulative values probably are going to be updated. Belief accumulator 204 outputs indicators 218. Indicators 218 include a belief indicator, or $B_k$, that gives the cumulative belief that a transmitter is within a grid cell based on the measurements received at discrete time instance k and the cumulative beliefs from previous measurements. Indicators 218 also include a disbelief indicator, or $D_k$, that gives the disbelief, i.e., that a transmitter is not within the grid cell. Indicators 218 also may include an ignorance indicator, or $I_k$, that provides an indication that there is not enough evidence to determine a cumulative belief or disbelief indicator. However, the cumulative ignorance indicator, or $I_k$, can be determined based on cumulative belief, and disbelief indicators, or $B_k$ and $D_k$, such that $I_k = 1 - B_k - D_k$. Indicators 218 are received by allocator 206. Allocator 206 uses the belief, disbelief and ignorance indicators, or $B_k$, $D_k$, and $I_k$, respectively, to determine a probability that the spectrum is not used, or a probability of a transmitter exists for each grid cell.

The allowable transmit power to protect a potential transmitter $NC_{i,j}$, within the grid cell, or $S_{i,j}$, detected with a DST algorithm is disclosed by equation 8 below. The maximum allowable transmit power is also referred as Maximum Interference Transmit Power (MIFTP). The expression below was developed under the assumption of Gaussian probability density function of the local mean propagation fluctuations. Otherwise, the function Q(.) should be replace with the estimated Cumulative Distribution Function (CDF) of real propagation losses measured in real scenarios:

$$MIFTP_{i,j}(k) = \quad \text{(Equation 8)}$$
$$I_m + g(R_{i,j}(k)) + \sigma Q^{-1}\left(1 - \frac{P_{int}}{(1 - P_{out}) \cdot (1 - D_{i,j}(k))}\right)$$

where:
$MIFTP_{i,j}$—represents the allowable transmit power everywhere within the grid cell (i,j);
Im=10 log 10(KTB)+INR—the maximum allowable interference level;
K=1.3807×10−23 J K−1, or a Boltzman constant;
B—communication system bandwidth.
T—the temperature of ambient environment (usually is 300K);
INR=interference to noise ratio;
$P_{out}$—outage probability of the NC system;
$D_{i,j}(k)$—the cumulative disbelief indicator of the grid cell (i,j) at discrete-time instant k;
$P_{int}$—maximum allowable interference probability that can be induced into NC system by XG transmitters;
$R_{i,j}(k)$—the distance between the node and the center of the grid cell (i,j) at discrete-time instant k;
g(.)—a defined function of distance, antenna heights, polarization, and frequency;
σ—standard deviation for modeling shadowing fluctuations of propagation losses;
TerrainType: 'sea water', 'marshy land', 'average terrain', 'plains', 'desert';
Q(x)—Error function;
From equation 8, the following relationship is observed:

$$\lim_{D_{i,j} \to 1 - P_{int}} MIFTP_{i,j}(P_{int}, D_{i,j}) = \infty. \quad \text{(Equation 9)}$$

Thus, in order to avoid causing any interference with a non-cooperative transmitter, the maximum allowable transmit power for each grid cell answerable to transceiver 200 is determined to be:

$$MIFTP = \min\{MIFTP_{i,j}(P_{int} \cdot D_{i,j})\} \quad \text{(Equation 10)}.$$

Allocator 206 also assigns a belief to the various grid cells to indicate whether the probability exists that a transmitter is within the grid cell. For example, considering the requirement that the probability of interference should not be greater than 0.01 then the grid cells having a belief value greater than 0.01 indicate that the spectrum is being used and that there is no availability for the cell. Grid cells having a disbelief value greater than 0.99 indicate that the spectrum is not used inside the cell. An indication also is given if there is not enough evidence for an unused spectrum classification. The limits given above are adjustable based on the interference limit requirements such that other belief and disbelief threshold values can be set in allocator 206.

Allocator 206 determines the status of each cell even if a measurement was not taken in the cell due to the group behavior relationships used in belief accumulator 204 and indicators 218. Allocator 206 compares the received values for cumulative belief, disbelief and ignorance, or $B_k$, $D_k$, and $I_k$, respectively, to thresholds for belief and disbelief. The thresholds are set prior to spectrum hole determination operations and may correspond to system requirements. If the cumulative belief value is greater than the belief threshold, then the grid cell is marked as containing a non-cooperating transmitter. Thus, spectrum is not available in this grid cell.

If the cumulative disbelief value is greater than the disbelief threshold, then the grid cell is marked as not containing a non-cooperative transmitter. Spectrum is available in the grid cell. If neither threshold is met or exceeded, then the grid cell is marked as ignorant because not enough information is available to make a spectrum availability determination. The goal of transceiver 200, however, is to mark as many grid cells as possible as having or not having a non-cooperating transmitter. A large batch of grid cells marked as ignorant does not provide very much useful information.

Thus, the accumulation of multiple measurements from previously received signals helps determine a spectrum hole. The process of determining a status of each grid cell also may be known as grid coloring because the cells can be assigned colors according to the belief or disbelief of the presence of a non-cooperative transmitter. Thus, allocator 206 issues command 220 to allow the application of transmit power as a result of the belief probability or command 222 to deny the application of transmit power as a result of the disbelief probability.

Further, grid cells may be analyzed by two or more different transceivers. Thus, different instantaneous belief and disbelief indicators may be determined by each transceiver such that the accumulated belief and disbelief indicators are updated multiple times for a single time instance k. The multiple updating of belief and disbelief for a cell may be referred to as fusing the belief and disbelief indicators. Fusing also may refer to the single update of the accumulated belief and disbelief indicators to generate the cumulative belief and disbelief indicators. Preferably, the present invention provides as much overlap as possible to trigger multiple updates as possible in the grid cells. More updates should result in indicators having a better representation of the status of the grid cell.

Figure 3:
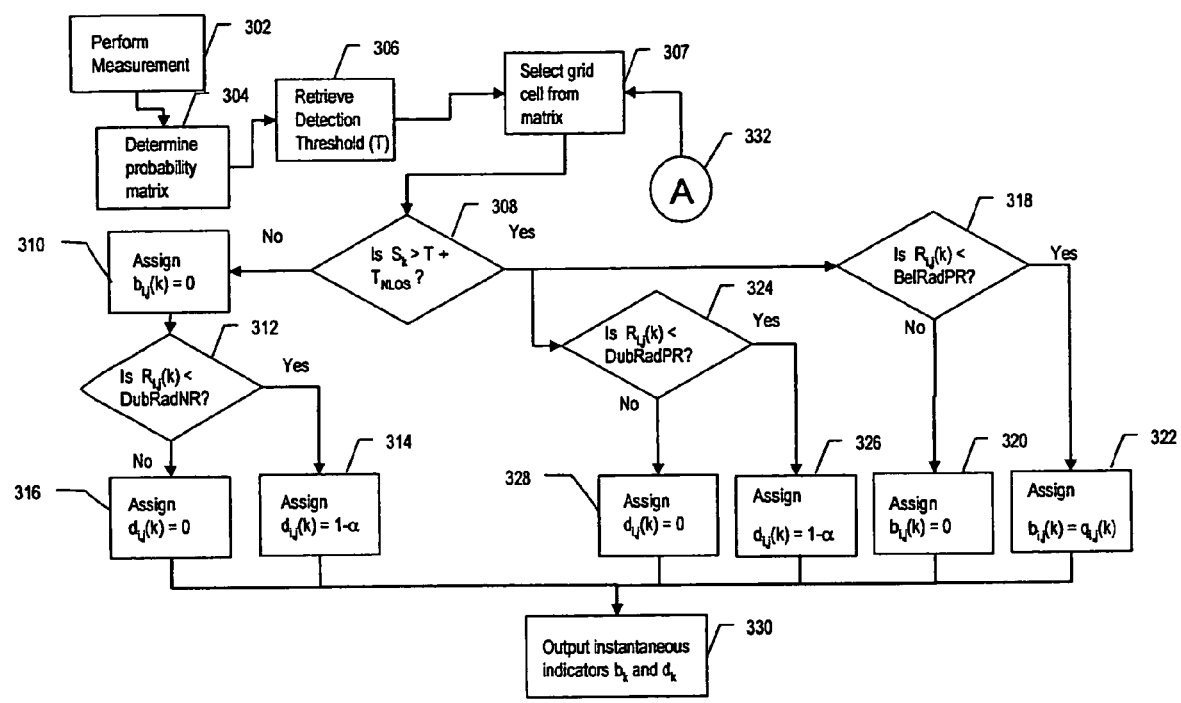
FIG. 3 illustrates a flowchart for evaluating a received measurement to determine instantaneous belief, disbelief and ignorance indicators according to the disclosed embodiments.

FIG. 3 depicts a flowchart 300 for evaluating a received measurement to determine instantaneous indicators for a grid cell according to the disclosed embodiments. The functions disclosed by FIG. 3 may be implemented by belief evaluator 202 depicted in FIG. 2A

Step 302 executes by performing a measurement at a transceiver, such as transceiver 200 shown above. The measurement is taken either on command or automatically by the transceiver. Preferably, step 302 is executed on a scheduled basis in synch with other transceivers. The measurement can be used to derive various parameters, such as a measured power level and other values from the measurement, such as those disclosed by FIGS. 2B and 2C. The measurement also is indexed by the discrete time instance, or k, that the measurement was taken.

Step 304 executes by determining the probability matrix of the presence of a non-cooperative transmitter using a grid cells within an area of interest for the new measurement. As disclosed above, each grid cell will have a probability, or $q_{i,j}(k)$, assigned to it that interfering signals are present within the grid cell. $N_k$ may be the size of the area at moment k where the transceiver updates the accumulated belief, disbelief and ignorance values, or $B_k$, $D_k$ and $I_k$, respectively. This parameter is a non-negative integer that is updated with each transceiver sensing position. The transceiver determines a distance percentile and divides it with the grid cell size. Outside the local area encompassing the transceiver, the belief, disbelief and ignorance values remain unchanged because they are not updated.

The probability matrix determined in step 304 is a $N_k$ by $N_k$ matrix including the grid cell probabilities for the area of interest as determined by the transceiver. The transceiver, preferably, is in the middle of the group of grid cells. A large matrix with the grid cell probabilities that have been taken for all possible combinations of the non-cooperating transmitter parameters might be computed in advance and stored in the memory such that the transceiver only reads what it needs from the memory. If not, then the grid cell probabilities would be computed at each measurement instant, or k, using equation 3.

Step 306 executes by retrieving the detection threshold, or T. The detection threshold may be set or fixed by design consideration, or by specification. Alternatively, the detection threshold varies within the transceiver or according to an input. The detection threshold corresponds to the power level needed to separate a received signal from noise. Step 307 executes by selecting a grid cell from the matrix of grid cells within the area of interest encompassing the transceiver. As disclosed above, a plurality of grid cells are analyzed in determining whether spectrum is available in the area. The grid cells may be differentiated by their distance from a reference point, such as the lower left corner of the grid. This step along with steps 308-330 and steps 402-424 of FIG. 4 disclosed below may be repeated for every grid cell within the area of interest containing the transceiver.

Step 308 executes by determining whether the new measurement for the grid cell is greater than the detection threshold plus any threshold adjustment needed to be made because of the line of sight to the transceiver from a transmitter. For example, the line of sight is not a straight line over flat terrain. Thus, a line of sight threshold adjustment, or $T_{NLOS}$, is defined to compensate for any variations in the detection threshold from the grid cell to the transceiver or a non-cooperating transmitter. The parameters also are defined by the design or specification.

If step 308 is no, then step 310 executes by assigning the instantaneous belief indicator, or $b_{i,j}(k)$, a value of 0. Thus, the probability of a belief that a transmitter is within the grid cell is 0. Thus, a spectrum hole may exist for the area including the grid cell because no signal was detected in the grid cell. The probability of a disbelief, or that a transmitter is not within the grid cell, is not automatically 100%. Step 312 executes by determining whether the distance from the transceiver to the center of the grid cell, or some other known location, or $R_{i,j}(k)$, is less than the parameter of the disbelief update radius with a negative reading, or DubRadNR 232 depicted in FIG.

2B. In other words, step 312 determines whether the grid cell is within the radius determined to provide a reliable assessment of the disbelief of the existence of a transmitter. The distance from the grid cell to the transceiver is based on prior knowledge of the size of the grid cells, and the location of the transceiver.

If step 312 is yes, then step 314 executes by assigning the instantaneous disbelief indicator, or $d_{i,j}(k)$ a value of $1-\alpha$, where $\alpha$ is the defined distance percentile, as disclosed above. Thus, if the distance percentile is 1%, then the instantaneous disbelief for the received measurement is 99%. If step 312 is no, then the distance from the transceiver to the grid cell exceeds the disbelief update radius and step 316 executes by assigning the instantaneous disbelief indicator a value of 0. The assigned values reflect the confidence that the transceiver can make a probability determination of the instant disbelief of a non-cooperating transmitter. If yes, then the grid cell is within the disbelief update radius, and the accumulated disbelief indicator is to be updated. If no, then the grid cell is outside the disbelief update radius, and the transceiver cannot determine with any certainty that a signal is or is not present in the grid cell.

Referring back to step 308, if the determination is yes, then step 318 executes by determining whether the distance $R_{i,j}(k)$ is less than the parameter of the belief update radius with a positive reading, or BelRadPR 250 depicted in FIG. 2C. If step 318 is no, then step 320 executes by assigning the instantaneous belief indicator, or $b_{i,j}(k)$, a value of 0. In other words, the probability of a transmitter in the grid cell i,j is zero (0) because the measured power is in a grid cell outside the belief update radius applicable for the transceiver.

If step 318 is yes, then step 322 executes by assigning the instantaneous belief indicator, or $b_{i,j}(k)$, a value of $q_{i,j}(k)$, where q is the probability value of the grid cell in the $N_k$ by $N_k$ matrix that includes the grid cell probabilities for the area if interest determined by the node or transceiver. The probabilities are computed in step 304, disclosed above.

Referring back to step 308, if the determination is yes, then step 324 also is executed by determining whether the distance from the center of the grid cell to the transceiver, or $R_{i,j}(k)$, is less than the parameter of the disbelief update radius with a positive reading, or DubRadPr 252 as depicted in FIG. 2C. If step 324 is yes, then step 326 executes by assigning the instantaneous disbelief indicator, or $d_{i,j}(k)$ a value of $1-\alpha$. If step 324 is no, then step 328 executes by assigning the instantaneous disbelief indicator, or $d_{i,j}(k)$ a value of 0.

After the instantaneous belief, instantaneous disbelief, and instantaneous ignorance indicators have been assigned, step 330 executes by outputting the indicators, preferably to the belief accumulator. Thus, FIG. 3 depicts how the instantaneous indicators are assigned for a new measurement received at the transceiver for a grid cell of a matrix of grid cells. By using the parameters depicted in FIGS. 2B and 2C, flowchart 300 compares the parameters to the distance value from the transceiver to the center of the grid cell to determine what probability values are assigned to the indicators for each grid cell.

Figure 4:
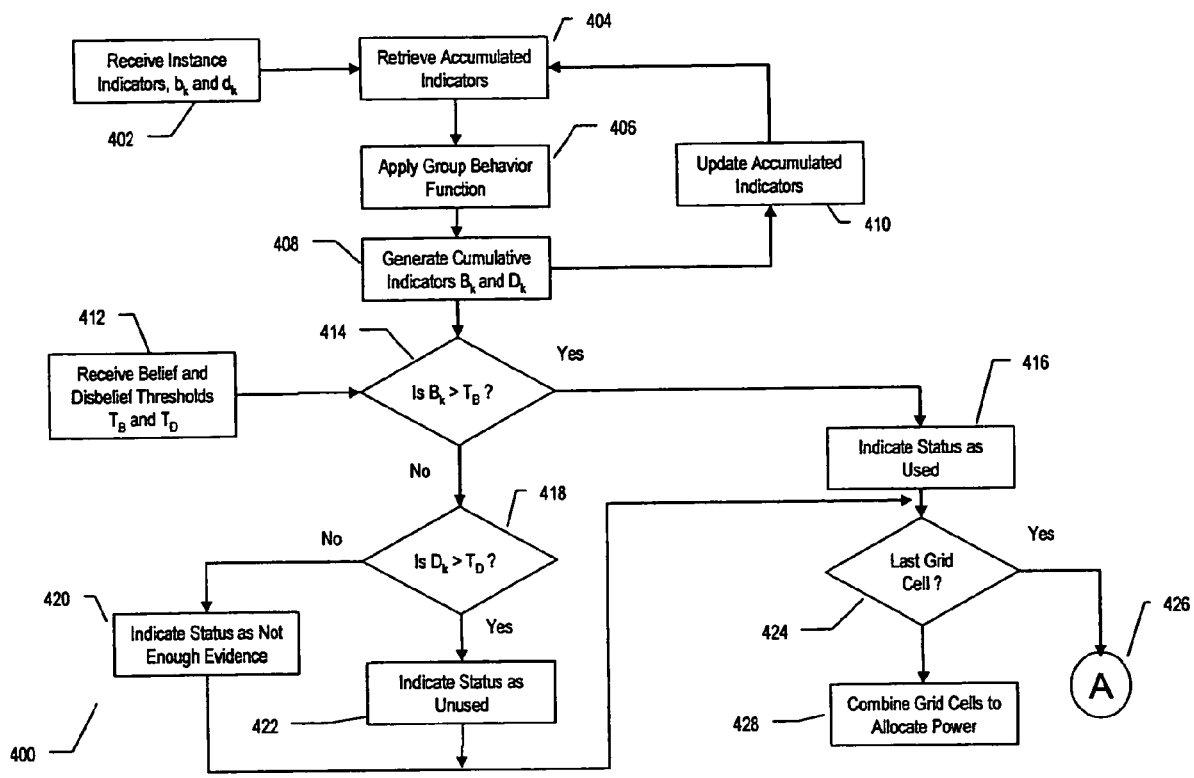
FIG. 4 illustrates a flowchart for determining the cumulative belief, the cumulative disbelief and the cumulative ignorance for the presence of a transmitter according to the disclosed embodiments.

FIG. 4 depicts a flowchart 400 for determining the belief or disbelief of the presence of a transmitter according to the disclosed embodiments. FIG. 4 relates to FIG. 3 in that step 402 executes by receiving the instantaneous belief and disbelief indicators, or $b_k$ and $d_k$, of a grid cell for a measurement taken by a transceiver. The indicators have values assigned to them for the probability for the belief and disbelief that a transmitter is operating within the grid cell. The grid cell may be one of a plurality of grid cells within an area of interest.

The functions disclosed by FIG. 4 may be implemented by belief accumulator 204 and allocator 206 depicted in FIG. 2A.

Step 404 executes by retrieving accumulated belief, disbelief and ignorance indicators from previous measurements, $B_{k-1}$, $D_{k-1}$, and $I_{k-1}$. Accumulated indicators are those indicators that have been calculated and fused together prior to the measurement at time instance k. Cumulative indicators are those indicators that result after the group behavior function is applied to the instantaneous indicators and the accumulated indicators to provide the belief, disbelief and ignorance at time instance k in grid cell i,j that a non-cooperating transmitter exists in the grid cell. The indicators may be designated $B_{k-1}$, $D_{k-1}$, and $I_{k-1}$, respectively. Unlike other spectrum sharing processes, the present invention keeps the results from previous measurements to better inform the current results from the instantaneous values. The results describe the belief, disbelief or ignorance at that point in time that a transmitter would interfere with a transmission or reception by the transceiver. The accumulated indicators are for each grid cell within an $N_k$ by $N_k$ matrix of grid cells. For each grid cell, values are determined for the cumulative belief, disbelief and ignorance of discovering an unused spectrum hole, or that a transmitter is not operating.

Step 406 executes by applying a group behavior function using the instantaneous belief, disbelief and ignorance indicators, or $b_k$, $d_k$ and $i_k$, and the accumulated indicators, $B_{k-1}$, $D_{k-1}$ and $I_{k-1}$. Preferably, the DST algorithm disclosed above is used to provide group behavior aspects to the indicators for the new measurement. Other group behavior algorithms also may be used to fuse the instantaneous and accumulated indicators. Step 408 executes by generating cumulative indicators, or $B_k$ and $D_k$, for the measurement at time instance k for the grid cell. In addition, an ignorance indicator, or $I_k=1-B_k-D_k$ may be generated to represent the ignorance of whether a transmitter is present or absent from a given area. Step 410 executes by updating the accumulated indicators within the $N_k$ by $N_k$ matrix in the belief accumulator, such as belief accumulator 204 depicted in FIG. 2A.

Step 412 executes by receiving or retrieving the belief threshold, or $T_B$, and the disbelief threshold, or $T_D$. As disclosed above, the thresholds may be set according to system requirements or specifications, or according to a desired radius or area of interest. The thresholds also may correspond to percentages of the power level desired to detect a signal within the transceiver and the density of the non-cooperative receivers located within the coverage area of the non-cooperative transceiver. Step 414 executes by determining if the cumulative belief indicator of the grid cell, or $B_{i,j}(k)$, for the measurement at time instance k is greater than the belief threshold, or $T_B$. If step 414 is yes, then step 416 executes by indicating a status of the grid cell as having used spectrum. In other words, a non-cooperating transmitter is being used and would interfere with any service initiated by the transceiver.

If step 414 is no, then step 418 executes by determining whether the cumulative disbelief indicator, or $D_{i,j}(k)$, of the grid cell for the measurement at time instance k is greater than the disbelief threshold, or $T_D$. If no, then step 420 executes by indicating a status of the grid cell as not having enough evidence to make a determination about the presence or absence of a transmitter. If step 418 is yes, then step 422 execute by indicating a status of the grid cell as having unused spectrum. In other words, a spectrum hole is available in the grid cell and the transceiver may initiate services without the fear of interference with a transmitter in that grid cell.

Step 424 executes by determining whether the current grid cell is the last grid cell within the grid cell matrix. If no, then the flowchart executes step 426, which goes back to step 332 of FIG. 3 to execute step 307 by selecting another grid cell for analysis and assignment of the probability of a belief, disbelief and ignorance of the presence of a non-cooperating transmitter within that grid cell. Step 424 should return the flow chart to step 307 until the final grid cell within the matrix is processed. Thus, all grid cells within the area of interest will be analyzed and assigned probabilities according to the present invention.

If step 424 is yes, then step 428 executes by combining the grid cells indicated as not being used to identify a spectrum hole using these grid cells. Step 428 also may allocate a power level to the transceiver according to the size of the combined grid cells having spectrum availability indicated above. Thus, the power level may be contingent on the size of the grid cells having spectrum availability. If the unused spectrum is indicated in multiple grid cells, then the allocated power is adjusted to reflect the larger unused spectrum.

After the status for a grid cell is indicated, different designations may be given to show the status of the cell, for example, on a map. Using the example, the grid cells with a belief greater than the belief threshold are colored in red to represent that the spectrum is used inside the grid cell. The grid cells with a disbelief greater than the disbelief threshold are colored in blue to represent that the spectrum is empty. Otherwise, the grid cells are colored yellow to represent that there is not enough evidence for unused spectrum classification.

When applied to a map having the grid cells shown on it, the unused spectrum is easily seen by referring to the blue cells, while the used spectrum is shown by the red cells. A plurality of blue cells means that the spectrum hole probably is larger than just a grid cell, and there is less likelihood of interference with another transmitter. Red cells mean the opposite.

The designations may be given in different colors or even different visual representations that show the number of unused spectrum cells versus the number of used spectrum cells. Using this information, a determination or estimation can be made as to the size of the spectrum hole, if any, and, therefore, the proper amount of power that can be allocated to a service on a transceiver within a grid cell within the spectrum hole. This feature enables continuous beliefs and disbeliefs to be recorded and monitored. Moreover, probabilities are assigned to a plurality of grid cells based on one measurement in the region of interest.

FIG. 5 depicts a diagram showing an approximation of the probability of a transmitter within a square cell according to the disclosed embodiments. The approximation disclosed by FIG. 5 may be used in the place of equations and processes disclosed above to determine the probability a transmitter is within a cell square. The probability is shown above as $q_{i,j}(k)$ for an instance in time k. The disclosed approximation reduces the time and resources needed to determine the probabilities for the cells.

Cell square $A_1A_2A_3A_4$ is shown. The length of the side of the square is s and the square is centered at $O_2$, which has the coordinates $(X_i, Y_j)$. FIG. 5 has another point, $O_1$, at coordinates $(X_{XG}, Y_{XG})$. $O_2$ is located at a distance from $O_1$, or $R_{i,j}$. The coordinates are based on a coordinate system in the x and y directions, or grid. Square $A_1A_2A_3A_4$ is a grid cell with a grid using the coordinate system.

A circle is shown within square $A_1A_2A_3A_4$ centered at $O_2$ with a radius of s/2. Two other circles centered at $O_1$ can be determined, and are shown by curves $T_1$ and $T_2$. The curves represent a portion of the circumference of the circles centered at $O_1$. Curve $T_1$ is from the inner circle centered at $O_1$ and has a radius $R_{i,j}-s/2$, which represents the point or points of the circle centered at $O_2$ closest to $O_1$. Curve $T_2$ is from the outer circle centered at $O_1$ and has a radius $R_{i,j}+s/2$, which represent the point or points of the circle centered at $O_2$ farthest away from $O_1$.

A region $M_1M_2M_3M_4$ is determined by the intersect points of the two tangent circles shown by $T_1$ and $T_2$ with two tangent lines from point $O_1$ to the circle centered at $O_2$. Region $M_1M_2M_3M_4$ may be approximate in size or area with square $A_1A_2A_3A_4$. Thus, the probability of a transmitter within square $A_1A_2A_3A_4$ is approximated with the probability within region $M_1M_2M_3M_4$. If the probability of a transmitter within region $M_1M_2M_3M_4$ can be determined, then that value may be used for $q_{i,j}(k)$ for square $A_1A_2A_3A_4$ within the grid.

The probability of a transmitter within region $M_1M_2M_3M_4$ is shown by the following expression:

$$q_{i,j} = \frac{\alpha_{i,j}}{2\pi}\left[Q\left(\frac{g(R_{i,j}+s/2)-L}{\sigma}\right) - Q\left(\frac{g(R_{i,j}+s/2)-L}{\sigma}\right)\right] \quad \text{(Equation 11)}$$

for any k=1, 2.

In Equation 11 above, $\alpha_{i,j}$ is the angle between the two tangent lines from point $O_1$ to the circle centered at $O_2$, L is the patent loss in dB estimated as the difference between the transmit power and the received signal level, and Q is the error function derived from Gaussian distribution, $N(0, \sigma)$, of the fluctuations encountered in the received signal levels. Using these values, the probability of a transmitter within a grid cell may be determined in a simpler and less intensive manner.

Thus, according to the embodiments of the present invention, a plurality of grid cells is identified within an area of interest encompassing a transceiver within a node. The node may be still or moving. The transceiver takes a measurement at a time instance k of received power level. The power level may or may not relate to an incoming signal from a non-cooperating transmitter. A detection threshold is set so that if the measurement is at or above the threshold, then a signal may be present.

The present invention analyzes each grid of the plurality of grid cells to determine the probability of the presence or absence of a non-cooperating transmitter. The present invention also uses previous measurements for the grid cell by the subject transceiver and other transceivers to provide better confidence to the probabilities. Using group behaviors, a cumulative value for the belief, disbelief and ignorance of the presence of a transmitter may be determined for each grid cell. The grid cells are combined to give a representation of the available spectrum to the transceiver, or to another device or central location. These grid cells may be combined with grid cells covered by other transceivers and processors to determine even larger spectrum holes.

It will be apparent to those skilled in the art that various modifications and variations can be made in the disclosed embodiments of the present invention without departing from the spirit or scope of the invention. Thus, it is intended that the present invention covers the modifications and variations of the invention provided that they come within the scope of any claims and their equivalents.

What is claimed is:

1. A method for determining spectrum availability for a transceiver, the method comprising:
    obtaining data from a database;
    determining a probability of a presence of a transmitter in a grid cell;
    assigning an instantaneous belief indicator, an instantaneous disbelief indicator, and an instantaneous ignorance indicator to the grid cell based at least in part upon the data obtained from the database;

determining a cumulative belief indicator, a cumulative disbelief indicator, and an ignorance indicator using the instantaneous belief indicator, the instantaneous disbelief indicator, and the instantaneous ignorance indicator; and indicating spectrum availability in the grid cell based on the cumulative belief indicator, the cumulative disbelief indicator, and an ignorance indicator.

2. The method of claim 1, wherein the data obtained from the database includes one or more of: a detection threshold, parameters determined by a propagation loss distribution function and a power level, and the probability of the presence of a transmitter.

3. The method of claim 1, further comprising the step of performing a measurement, wherein the probability of the presence of a transmitter in the grid cell is determined based at least in part upon the measurement.

4. The method of claim 3, wherein the measurement includes a measurement of a power level.

5. The method of claim 3, wherein the measurement includes a measurement of a parameter other than the power level.

6. The method of claim 1, wherein the probability of the presence of a transmitter in the grid cell is determined based at least in part upon data obtained from a database.

7. The method of claim 1, wherein the step of determining the cumulative belief indicator, cumulative disbelief indicator, and ignorance indicator includes applying a group behavior algorithm to determine the cumulative belief indicator, the cumulative disbelief indicator, the ignorance indicator using the instantaneous belief, disbelief, and ignorance indicators.

8. The method of claim 7, wherein the step of applying the group behavior algorithm includes using an accumulated belief indicator, an accumulated disbelief indicator in the group behavior algorithm along with the instantaneous belief, disbelief and ignorance indicators.

9. The method of claim 1, further comprising allocating power to a transceiver based upon the spectrum availability in the grid cell.

10. A method for determining spectrum availability for a transceiver, the method comprising:

obtaining data from a database;

determining a probability of a presence of a transmitter in a grid cell;

assigning an instantaneous belief indicator, an instantaneous disbelief indicator, and an instantaneous ignorance indicator to the grid cell;

determining a cumulative belief indicator, a cumulative disbelief indicator, and an ignorance indicator using one or more of: the instantaneous belief indicator, the instantaneous disbelief indicator, the instantaneous ignorance indicator, and the data obtained from the database; and indicating spectrum availability in the grid cell based on the cumulative belief indicator, the cumulative disbelief indicator, and an ignorance indicator.

11. The method of claim 10, wherein the instantaneous belief indicator, the instantaneous disbelieve indicator, and the instantaneous ignorance indicator are determined based at least in part upon one or more of: a detection threshold, parameters determined by a propagation loss distribution function and a power level, and the probability of the presence of a transmitter.

12. The method of claim 10, further comprising the step of performing a measurement, wherein the probability of the presence of a transmitter in the grid cell is determined based at least in part upon the measurement.

13. The method of claim 12, wherein the measurement includes a measurement of a power level.

14. The method of claim 12, wherein the measurement includes a measurement of a parameter other than a power level.

15. The method of claim 10, wherein the probability of the presence of a transmitter in the grid cell is determined based at least in part upon data obtained from a database.

16. The method of claim 10, wherein at least one of the instantaneous belief indicator, the instantaneous disbelief indicator, and the instantaneous ignorance indicator assigned to the grid cell is further determined based at least in part upon data obtained from a database.

17. The method of claim 10, wherein the step of determining the cumulative belief indicator, cumulative disbelief indicator, and ignorance indicator includes applying a group behavior algorithm to determine the cumulative belief indicator, the cumulative disbelief indicator, the ignorance indicator using the instantaneous belief, disbelief, and ignorance indicators.

18. The method of claim 17, wherein the step of applying the group behavior algorithm includes using an accumulated belief indicator, an accumulated disbelief indicator in the group behavior algorithm along with the instantaneous belief, disbelief and ignorance indicators.

19. The method of claim 10, further comprising allocating power to a transceiver based upon the spectrum availability in the grid cell.

20. A transceiver comprising:

a data receiver to obtain data from a database;

a belief evaluator to assign a probability of a presence of a transmitter in a grid cell and to determine an instantaneous belief indicator, an instantaneous disbelief indicator and an instantaneous ignorance indicator for the grid cell within an area based upon one or more of: a measurement of a power level, a detection threshold, the probability, and data obtained by the data receiver;

a belief accumulator to determine a cumulative belief indicator, a cumulative disbelief indicator and an ignorance indicator for the presence of a transmitter within the grid cell based upon one or more of: the instantaneous belief indicator, the instantaneous disbelief indicator, the instantaneous ignorance indicator, accumulated belief, disbelief and ignorance indicators, and data obtained by the data receiver, in a group behavior algorithm; and an allocator to indicate spectrum availability within the grid cell according to the cumulative belief indicator, the cumulative disbelief indicator, and ignorance indicator.

* * * * *